US012608587B2

(12) United States Patent
Fais et al.

(10) Patent No.: US 12,608,587 B2
(45) Date of Patent: Apr. 21, 2026

(54) NEURAL NETWORK PROCESSOR

(71) Applicant: Mobileye Vision Technologies Ltd., Jerusalem (IL)

(72) Inventors: Yaniv Fais, Tel Aviv (IL); Avner Strum, Haifa (IL); Liran Levy, Kiryat Ata (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 1128 days.

(21) Appl. No.: 17/556,229

(22) Filed: Dec. 20, 2021

(65) Prior Publication Data
US 2022/0215226 A1    Jul. 7, 2022

Related U.S. Application Data

(60) Provisional application No. 63/134,867, filed on Jan. 7, 2021.

(51) Int. Cl.
 *G06N 3/04*     (2023.01)
 *G06F 9/30*     (2018.01)
 *G06N 3/10*     (2006.01)
(52) U.S. Cl.
 CPC .......... *G06N 3/04* (2013.01); *G06F 9/30134* (2013.01); *G06N 3/10* (2013.01)
(58) Field of Classification Search
 CPC ......... G06N 3/04; G06N 3/10; G06F 9/30134
 See application file for complete search history.

(56) References Cited

U.S. PATENT DOCUMENTS

| | | | | |
|---|---|---|---|---|
| 2016/0342892 A1* | 11/2016 | Ross | ................... | G06F 15/8046 |
| 2017/0270403 A1* | 9/2017 | Zhang | ...................... | G06N 3/04 |
| 2019/0012574 A1* | 1/2019 | Anthony | .............. | G05D 1/0088 |
| 2019/0364174 A1* | 11/2019 | Shacham | ............ | G06F 9/30036 |
| 2020/0394500 A1* | 12/2020 | Hill | ......................... | G06N 3/063 |
| 2021/0004633 A1* | 1/2021 | Shacham | ............ | G06F 9/30032 |
| 2021/0209339 A1* | 7/2021 | You | ...................... | G06V 10/454 |
| 2022/0092393 A1* | 3/2022 | Aguiar | .............. | G11C 13/0002 |

* cited by examiner

*Primary Examiner* — Andrew J Jung
(74) *Attorney, Agent, or Firm* — Schwegman Lundberg & Woessner, P.A.

(57)     ABSTRACT

A method for neural network processing, the method may include applying, by a neural network processor, a group of neural network kernels of respective layers of a neural network to provide neural network output results. The applying may include applying a (2D) kernel of the group of kernels on 2D layer input values of a first layer of the neural network to provide first layer output values. The applying may include scanning the 2D layer input values with the 2D kernel. The scanning may include flattening the 2D kernel, flattening the 2D layer input values, and storing first layer output values in a 3D memory unit. The applying may also include applying a 3D kernel of the group of kernels, on 3D layer input values of a second layer of the neural network to provide second layer output values, wherein the applying comprises scanning at least one feature vector of the 3D layer input values with at least one vector of the 3D kernel.

24 Claims, 20 Drawing Sheets

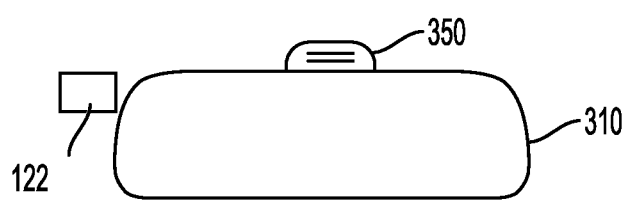
350
122
310
170
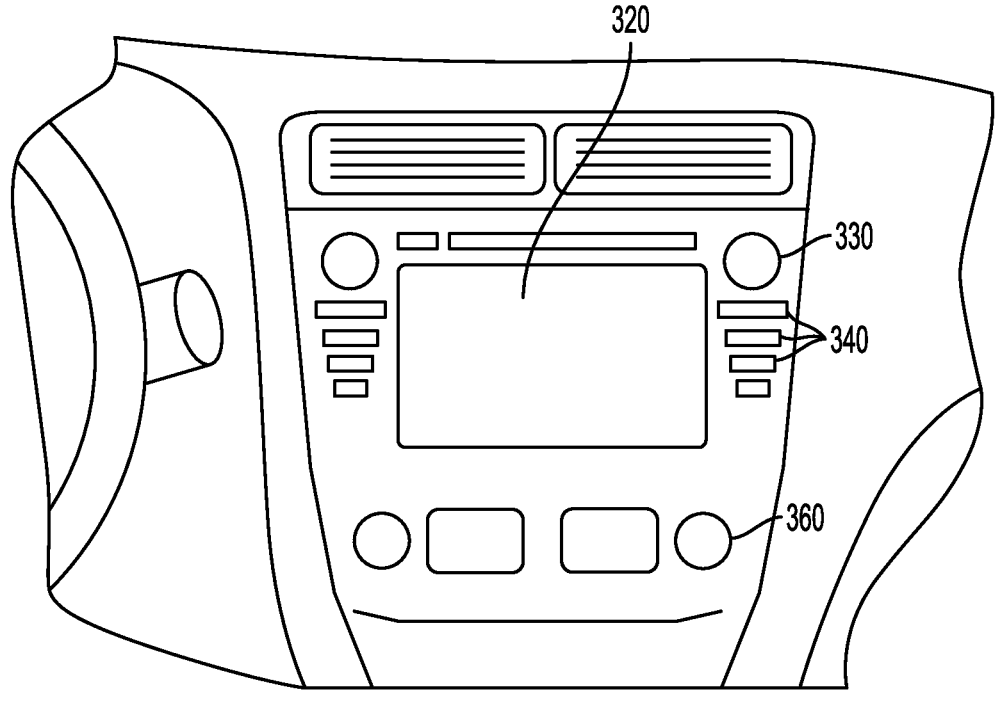
320
330
340
360
FIG. 3

669

660

660(1,1)

660(1,8)

661

660(8,1)

660(8,8)

700

Kernel memory
710

First input data
memory
720

Manipulator
740

Processing unit
730

3D memory unit
750

Controller
770

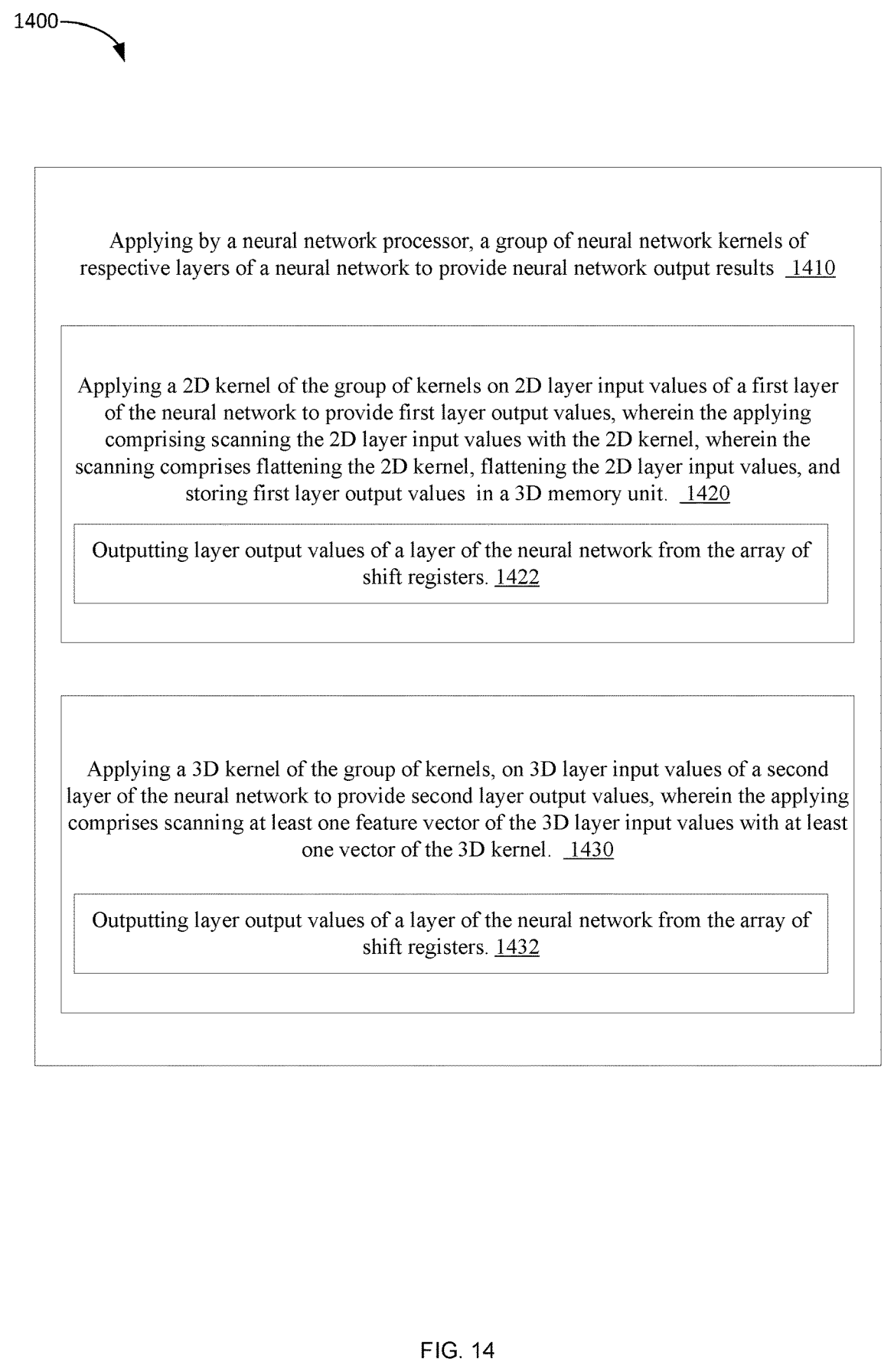

1400 —

Applying by a neural network processor, a group of neural network kernels of respective layers of a neural network to provide neural network output results 1410

Applying a 2D kernel of the group of kernels on 2D layer input values of a first layer of the neural network to provide first layer output values, wherein the applying comprising scanning the 2D layer input values with the 2D kernel, wherein the scanning comprises flattening the 2D kernel, flattening the 2D layer input values, and storing first layer output values in a 3D memory unit. 1420

Outputting layer output values of a layer of the neural network from the array of shift registers. 1422

Applying a 3D kernel of the group of kernels, on 3D layer input values of a second layer of the neural network to provide second layer output values, wherein the applying comprises scanning at least one feature vector of the 3D layer input values with at least one vector of the 3D kernel. 1430

Outputting layer output values of a layer of the neural network from the array of shift registers. 1432

FIG. 14

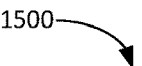

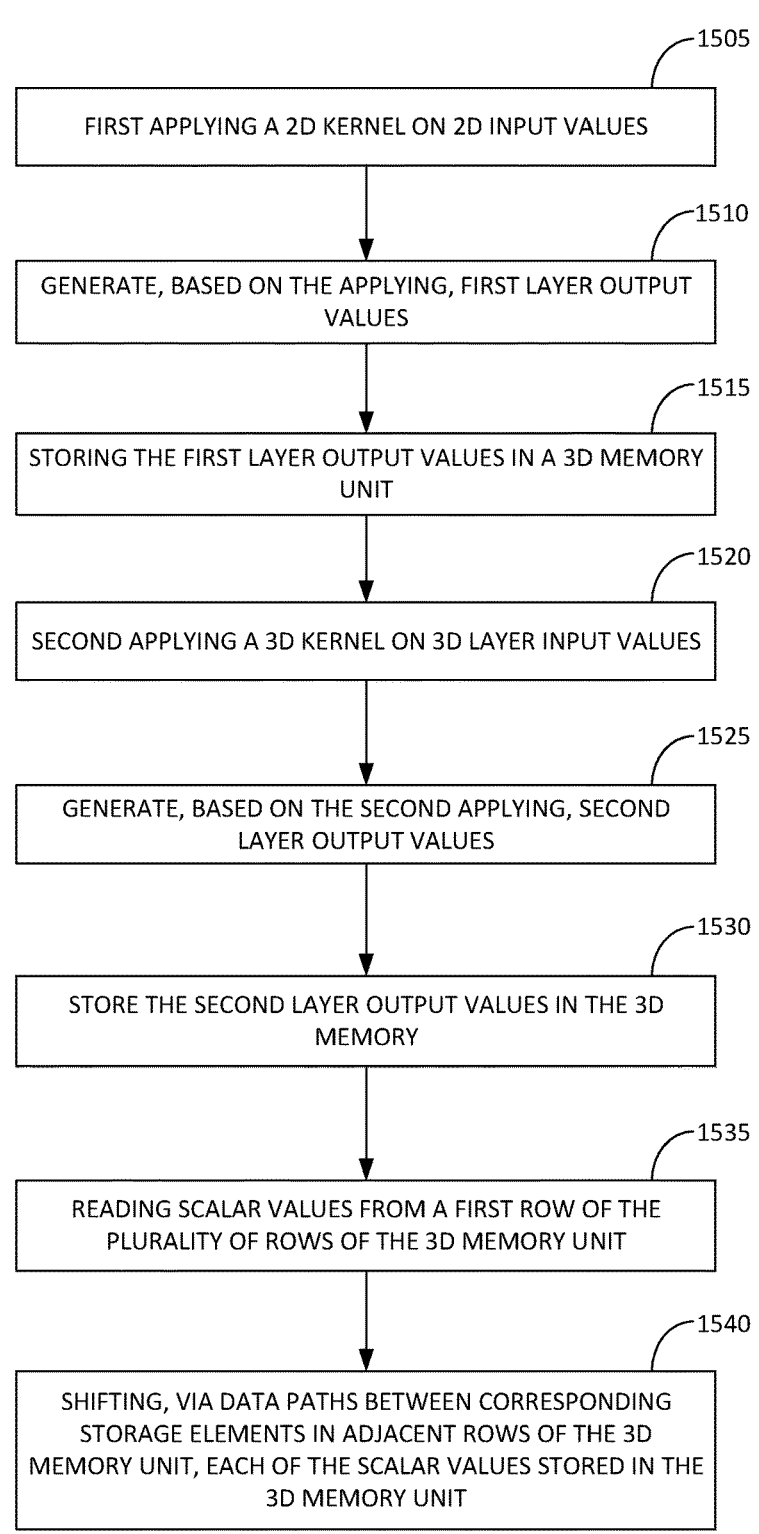

1505

FIRST APPLYING A 2D KERNEL ON 2D INPUT VALUES

1510

GENERATE, BASED ON THE APPLYING, FIRST LAYER OUTPUT VALUES

1515

STORING THE FIRST LAYER OUTPUT VALUES IN A 3D MEMORY UNIT

1520

SECOND APPLYING A 3D KERNEL ON 3D LAYER INPUT VALUES

1525

GENERATE, BASED ON THE SECOND APPLYING, SECOND LAYER OUTPUT VALUES

1530

STORE THE SECOND LAYER OUTPUT VALUES IN THE 3D MEMORY

1535

READING SCALAR VALUES FROM A FIRST ROW OF THE PLURALITY OF ROWS OF THE 3D MEMORY UNIT

1540

SHIFTING, VIA DATA PATHS BETWEEN CORRESPONDING STORAGE ELEMENTS IN ADJACENT ROWS OF THE 3D MEMORY UNIT, EACH OF THE SCALAR VALUES STORED IN THE 3D MEMORY UNIT

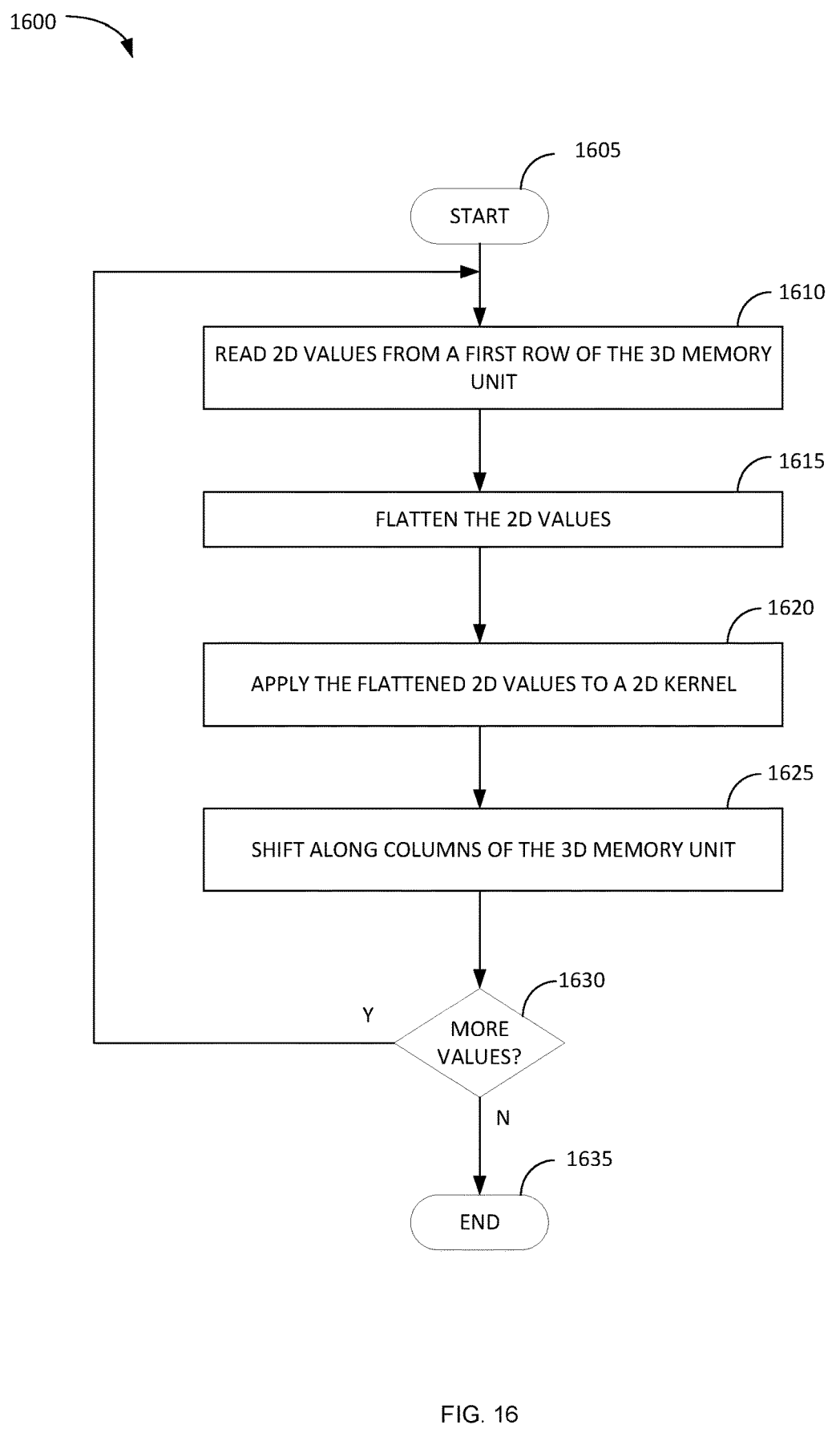

START

1610

READ 2D VALUES FROM A FIRST ROW OF THE 3D MEMORY UNIT

1615

FLATTEN THE 2D VALUES

1620

APPLY THE FLATTENED 2D VALUES TO A 2D KERNEL

1625

SHIFT ALONG COLUMNS OF THE 3D MEMORY UNIT

1630

Y

MORE VALUES?

N

1635

END

FIG. 16

NEURAL NETWORK PROCESSOR

PRIORITY

This application claims the benefit of priority to U.S. Provisional Application Ser. No. 63/134,867, filed Jan. 7, 2021, which is incorporated by reference herein in its entirety.

BACKGROUND

Advanced driver assistance systems (ADAS), and autonomous vehicle (AV) systems use cameras and other sensors together with object classifiers, which are designed to detect specific objects in an environment of a vehicle navigating a road. Object classifiers are designed to detect predefined objects and are used within ADAS and AV systems to control the vehicle or alert a driver based on the type of object that is detected and its location, etc. Autonomous driving typically involves substantial use of vector processing capabilities. Thus, it is desirable to improve the efficiency of vector processing in autonomous vehicle applications.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a diagrammatic representation of an interior of a vehicle including a rearview mirror and a user interface for a vehicle imaging system consistent with the disclosed embodiments;

FIG. 14 illustrates a process of neural network processing;

FIG. 15 illustrates a process for neural network processing; and

FIG. 16 illustrates a process for neural network processing.

DETAILED DESCRIPTION OF THE DRAWINGS

Figure 1:
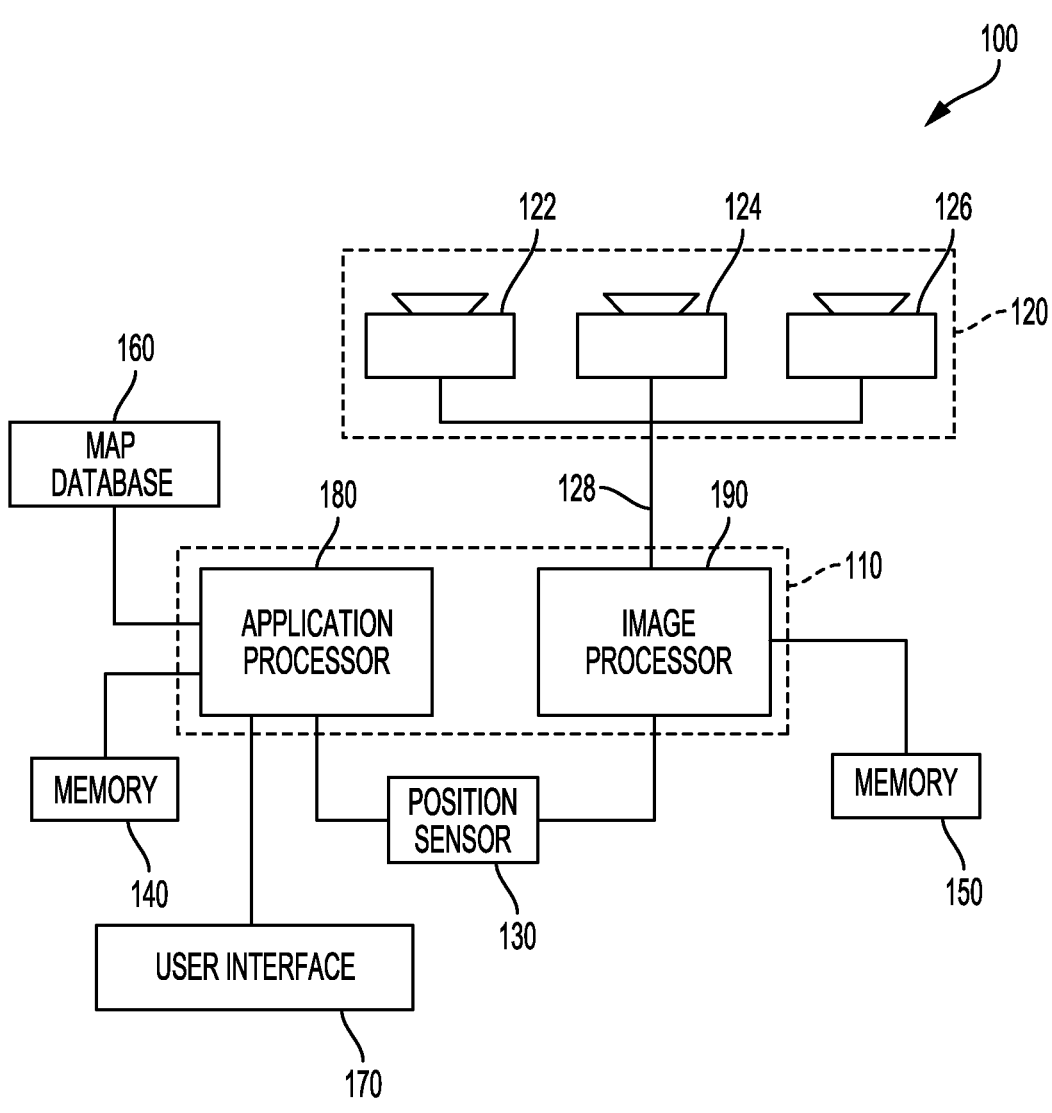
FIG. 1 is a block diagram representation of a system implemented by one or more of the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Disclosed embodiments provide systems and methods that can be used as part of or in combination with autonomous navigation/driving and/or driver assist technology features. Driver assist technology refers to any suitable technology to assist drivers in the navigation and/or control of their vehicles, such as forward collision warning (FCW), lane departure warning (LDW) and traffic sign recognition (TSR), as opposed to fully autonomous driving. In various embodiments, the system may include one, two or more cameras mountable in a vehicle and an associated processor that monitor the environment of the vehicle. In further embodiments, additional types of sensors can be mounted in the vehicle and can be used in the autonomous navigation and/or driver assist system. In some examples of the presently disclosed subject matter, the system may provide techniques for processing images of an environment ahead of a vehicle navigating a road for training neural networks or deep learning algorithms to estimate a future path of a vehicle based on images. In yet further examples of the presently disclosed subject matter, the system may provide techniques for processing images of an environment ahead of a vehicle navigating a road using a trained neural network to estimate a future path of the vehicle.

In some embodiments, a pixel is a picture element obtained by a camera. In some embodiments, a pixel is a processed picture element, which has been pre-processing in circuits attached to a camera sensor's picture element.

When processing images captured by a vehicle mounted camera, two-dimensional processing of image data is performed. For example, a two-dimensional image is captured by an on-board imaging sensor. The two-dimensional image encodes the image via a plurality of binary values. However, applying depth-oriented vectors on 2D input values, such as those from the two-dimensional image is highly inefficient. For example, if a 3D memory unit includes 3D data, but that 3D data is to be processed against the 2D input values, only a first row of the 3D data is operated on in any one operation. Thus, in a configuration having 3D data of depth D1, which is processed with 2D input values, a throughput of such calculation will be (1/D1) of the maximal available throughput of the 3D memory unit.

To provide for increased efficiency when utilizing depth-oriented vectors, the disclosed embodiments employ a 3D memory element that can be used for both 2D and 3D operations. In particular, the disclosed 3D memory unit provides for shifting of values across rows of the 3D memory element. By providing for an ability to shift data values across rows of the 3D memory element, access to depth-oriented vector data is greatly enhanced, improving utilization of the available computer hardware and thus increasing throughput.

Before discussing in detail examples of a 3D memory element utilized in embodiments of this disclosure, there is provided a description of various possible implementations and configurations of a vehicle mountable system that can be used for carrying out and implementing the methods according to examples of the presently disclosed subject matter. In some embodiments, various examples of the system can be mounted in a vehicle, and can be operated while the vehicle is in motion. In some embodiments, the system can implement the methods according to examples of the presently disclosed subject matter.

FIG. 1, to which reference is now made, is a block diagram representation of a system consistent with the disclosed embodiments. System 100 can include various components depending on the requirements of a particular implementation. In some examples, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition unit s and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a values interface 128 communicatively connecting the processing unit 110 to image acquisition unit 120. For example, values interface 128 can include any wired and/or wireless link or links for transmitting image values acquired by image acquisition unit 120 to processing unit 110.

Both the application processor 180 and the image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing units with local memory and instruction sets. Such processors may include video inputs for receiving image values from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP® and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random-access memories, read only memories, flash memories, disk drives, optical storage, removable storage, and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units can include random access memory, read only memory, flash memory, disk drives, optical storage, tape storage, removable storage, and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectible to various systems, devices and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system (e.g., throttling system 220, braking system 230, and steering system 240 of FIG. 2E).

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include values relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively, or additionally, map database 160 or a portion thereof can be located remotely with respect to other components of system 100 (e.g., processing unit 110). In such embodiments, information from map database 160 can be downloaded over a wired or wireless values connection to a network (e.g., over a cellular network and/or the Internet, etc.).

Image capture device 122, image capture device 124, and image capture device 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture device 122, image capture device 124, and image capture device 126 will be further described with reference to FIGS. 2B-2E, below.

It would be appreciated that the system 100 can include or can be operatively associated with other types of sensors, including for example: an acoustic sensor, a radio frequency (RF) sensor (e.g., radar transceiver), a LIDAR sensor. Such sensors can be used independently of or in cooperation with the image acquisition unit 120. For example, the values from the radar system (not shown) can be used for validating the processed information that is received from processing images acquired by the image acquisition unit 120, e.g., to filter certain false positives resulting from processing images acquired by the image acquisition unit 120, or it can be combined with or otherwise compliment the image values from the image acquisition unit 120, or some processed variation or derivative of the image values from the image acquisition unit 120.

Figure 2A:
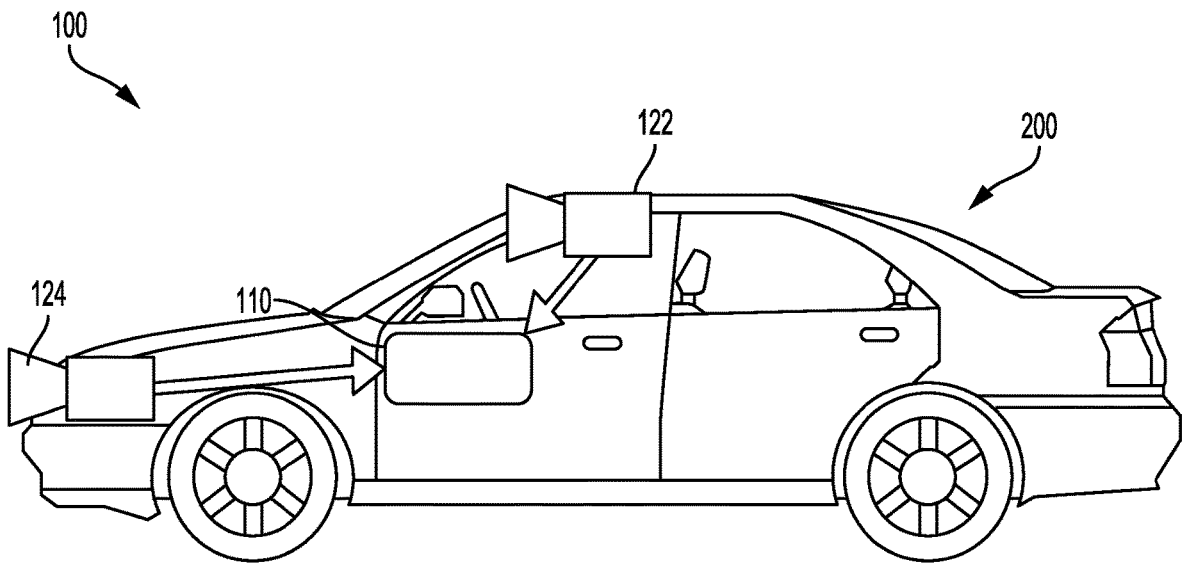
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments the vehicle 200 can be equipped with only a single-image capture device (e.g., camera), in other embodiments, such as those discussed in connection with FIGS. 2B-2E, multiple image capture devices can be used. For example, either of image capture device 122 or image capture device 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture device 122, image capture device 124, and image capture device 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image acquisition unit 120, or an image capture device that is one of a plurality of image capture devices that are used in an image acquisition unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 200 can be include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
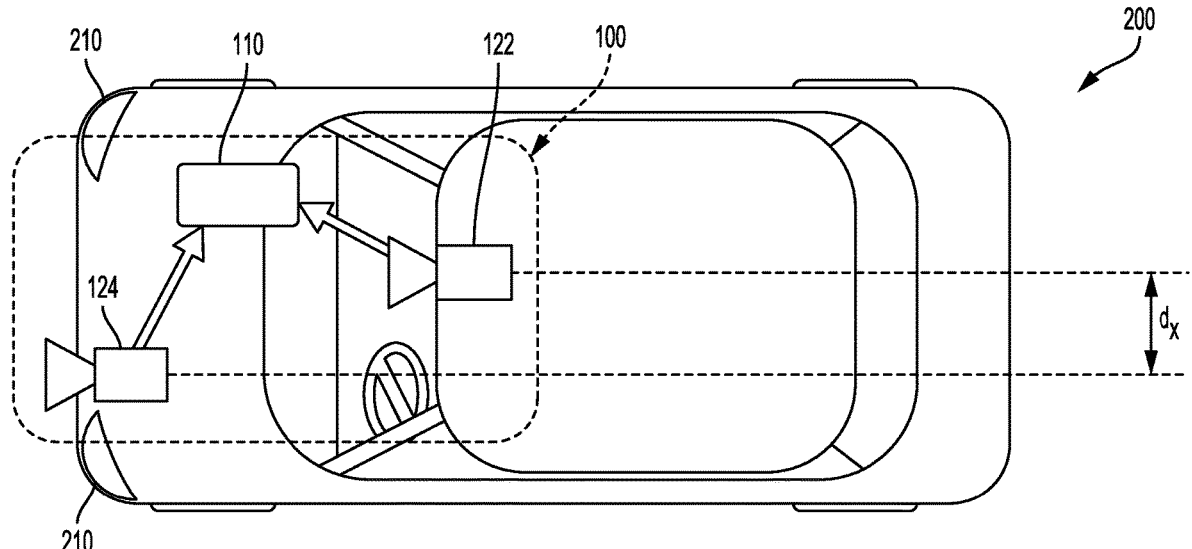
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 1210) of vehicle 200, and a processing unit 110.

Figure 2C:
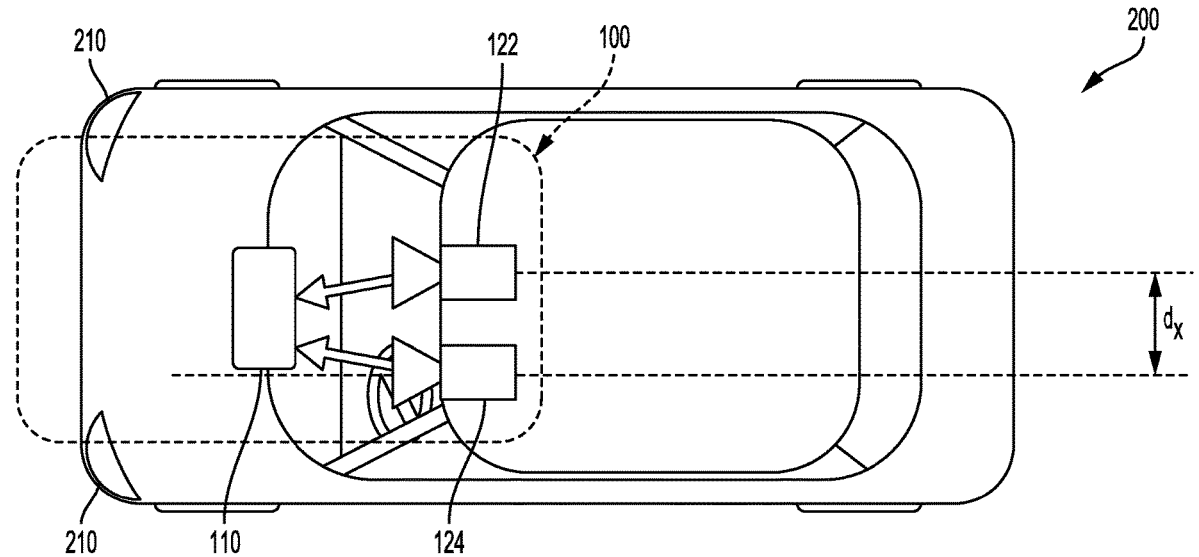
FIG. 2C is a diagrammatic top view representation of another embodiment of a vehicle including a system consistent with the disclosed embodiments.

As illustrated in FIG. 2C, image capture device 122 and image capture device 124 may both be positioned in the vicinity of the rearview mirror and/or near the driver of vehicle 200. Additionally, while the image capture device 122 and the image capture device 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
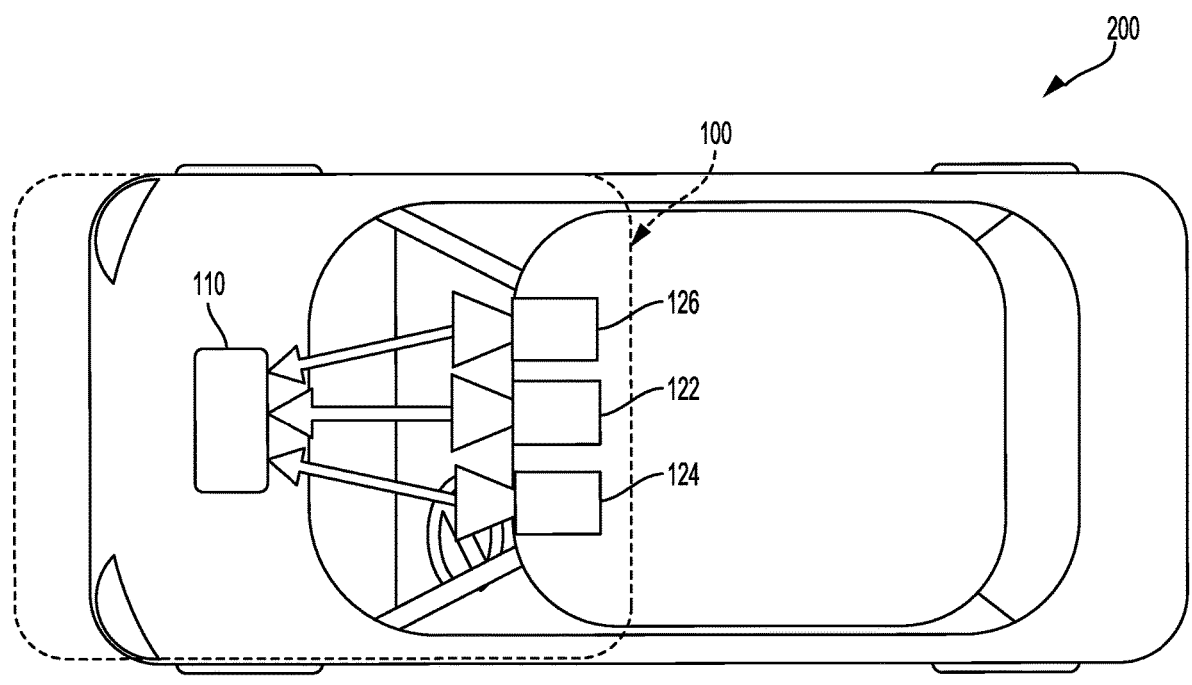
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired (and known) field-of-view (FOV).

The first image capture device 122 may have a scan rate associated with acquisition of each of the first series of image scan lines. The scan rate may refer to a rate at which an image sensor can acquire image values associated with each pixel included in a particular scan line.

Figure 2E:
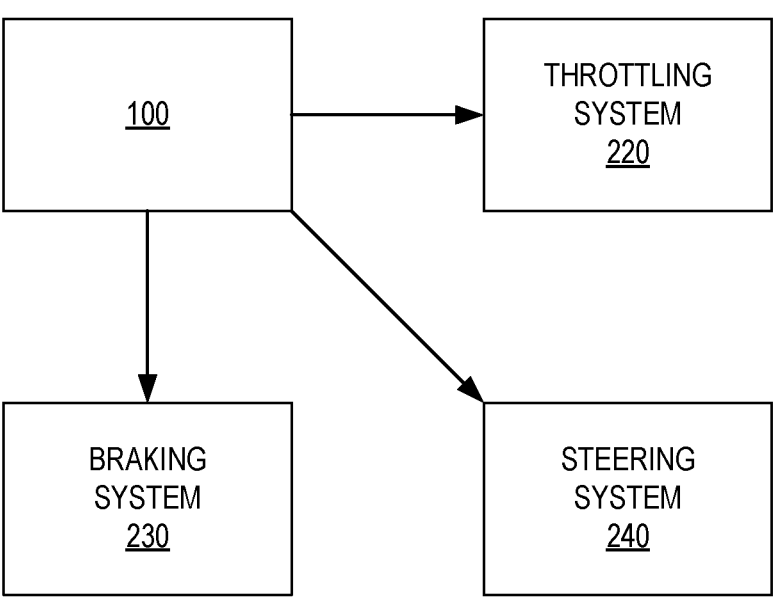
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more values links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

As shown in FIG. 3, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside the vehicle 200, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position values (e.g., GPS location information), map data, speed data, and/or values from sensors included in vehicle 200. System 100 may collect the values for analysis from, for example, image acquisition unit 120, position sensor 130, and other sensors. Further, system 100 may analyze the collected values to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected values and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

The term "layer" means a layer of a neural network.

The processing unit may include a neural network processor. A neural network processor may be configured to perform neural network operations. The neural network may be of any type (convolutional, non-convolutional, and the like).

The neural network may include one or more integrated circuits, may be implemented by one or more integrated circuits, and the like. The one or more integrated circuits may be hardware accelerators, general purpose processors, central processing units, systems on chip, image processors, field programmable gate arrays, application specific integrated circuits, and the like.

Neural networks processors may be used in various systems, including but not limited to ADAS systems and AV systems.

A neural network may include different layers. Neural network processing maybe executed one layer after the other.

Each layer is configured to receive layer input values, apply a kernel (a 2D kernel or 3D kernel) to provide layer output values. The layer output values may be a 3D layer output values or a 2D layer output values. In some cases, the 2D layer output values may be a relevant portion of 3D layer output values. The layer output values of a last (or final) layer of the neural network may be regarded as an output of the neural network.

In many neural networks, most of the layers are configured to receive 3D layer input values, and apply a 3D kernel to provide 3D layer output values. The applying of the 3D kernel includes, in at least some embodiments, scanning the 3D layer input values with one or more depth-oriented vectors, whereas a depth-oriented vector is directed along a depth of the 3D kernel.

Different layers may apply different kernels. The kernels may differ from each other by one or more of depth, width, length, values of kernel coefficients, shape, and the like.

Scanning 2D layer input values with one or more depth-oriented vectors is highly inefficient—as only a first element of each depth vector is relevant to the generation of the 2D layer output values.

The disclosed method, integrated circuit, and non-transitory computer readable medium (hereinafter "computer readable medium") manipulate the kernel and the layer input values to provide an efficient neural network processing scheme.

The disclosed method, integrated circuit and computer readable medium may be configured to store layer output values in a 3D memory unit, and retrieve from the 3D memory unit, relevant layer output values. For example, the relevant layer output values may be the first elements of the 3D layer output values, may be some of the elements of the 3D layer output values, or may be all of the 3D layer output values.

The disclosed method, integrated circuit and computer readable medium may use the same 3D memory unit to store scalar outputs of 2D and 3D kernel calculations, and by manipulating kernel and/or layer input values, facilitate higher throughput of neural network processing.

Figure 4:
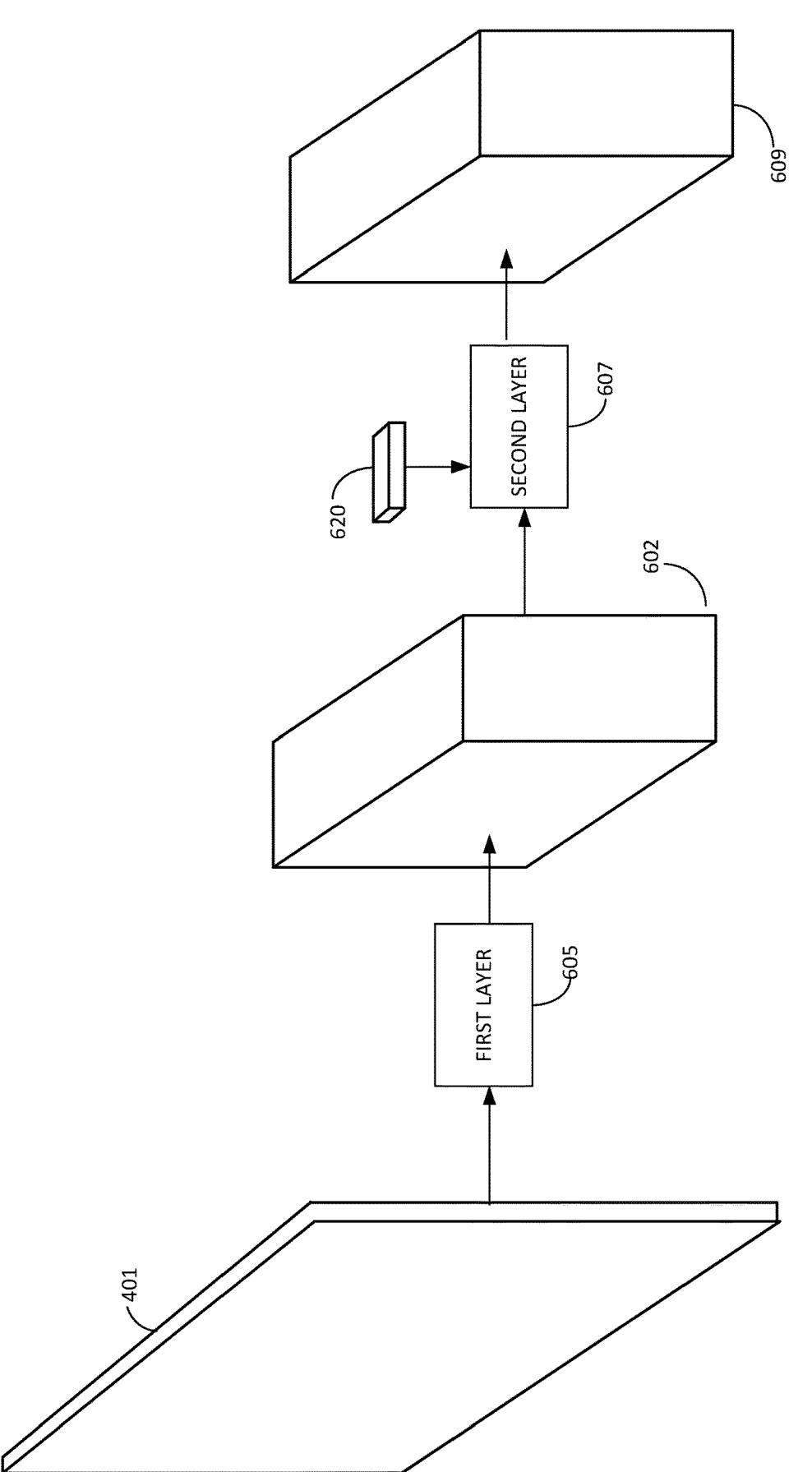
FIG. 4 illustrates example input values of different layers of a neural network.

FIG. 4 illustrates an example of layer input values of different layers of a neural network. A first layer 605 is configured to receive 2D first layer input values 401. An example depth of the 2D first input values 401 is one. The 2D first layer input values 401 may be included in an image, synthetic information, sensed information of any type, and the like. The first layer 605 is configured to output 2D first layer output values 602.

Although the first layer 605 receives the 2D first layer input values 401, the first layer 605 is configured to receive, in at least some embodiments, three-dimensional information, including one or more of point cloud data, a range map, a combination of a 2D image and depth information, and the like.

3D first layer output values 602 that illustrated to be of a 3D format. A second layer 607 is configured to receive the 3D first layer output values 602 and scan it with a 3D kernel 620 to provide 3D second layer output values 609. The 3D kernel 620 includes multiple depth-oriented vectors.

Figure 5:
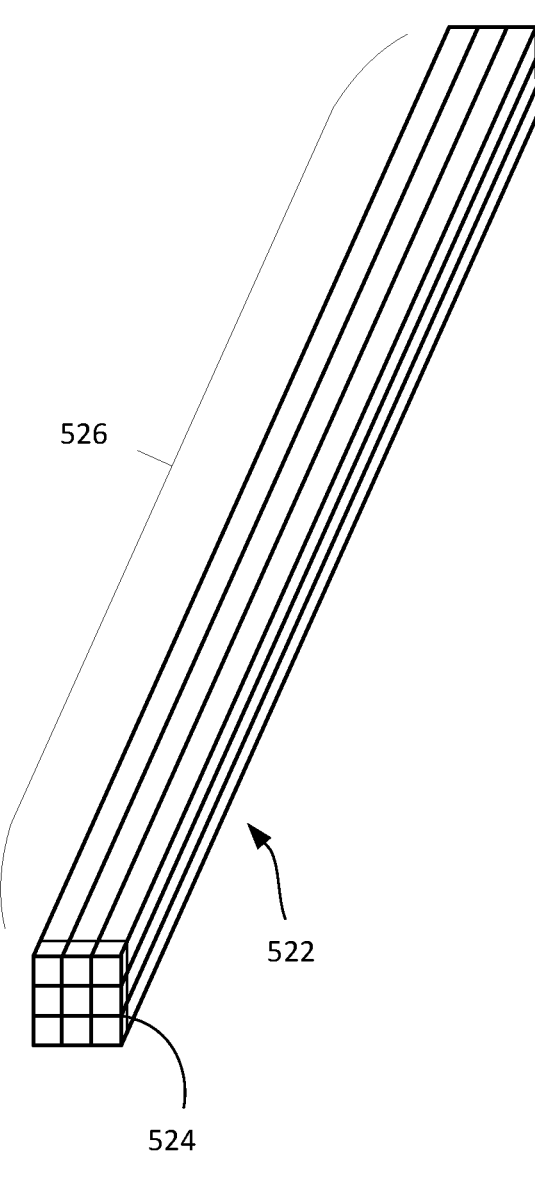
FIG. 5 illustrates an example of a three-dimensional (3D) kernel.

FIG. 5 illustrates the 3D kernel 522 as including nine depth-oriented vectors 526 arranged in rows and columns (3×3) that have first elements 524.

Applying such depth-oriented vectors on 2D input values (e.g., such as 2D first input values 401 illustrated in FIG. 4) is highly inefficient as only the first elements 524 of each depth-oriented vector will be relevant in such an operation. Assuming that each depth-oriented vector includes D1 elements, then the throughput of such an operation on 2D input data will be (1/D1) of a maximal available throughput provided by the depth-oriented vectors 526.

Figure 6:
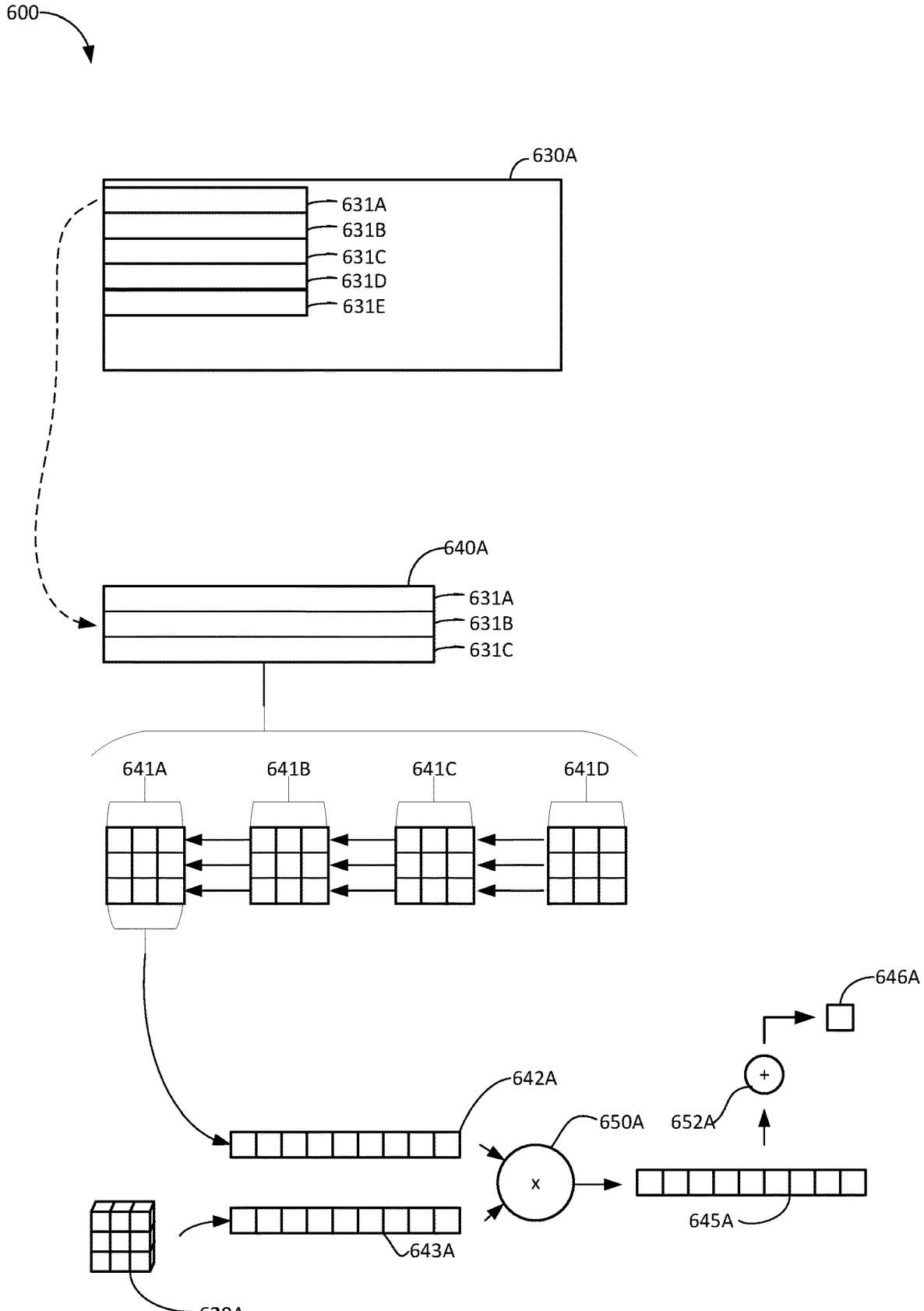
FIG. 6 illustrates a data flow that applies a two-dimensional (2D) kernel on 2D first layer input values obtained from an image.

FIG. 6 illustrates an example data flow 600 when applying a 2D kernel on a vector including 2D first layer input values received from an image 630A. The data flow 600 illustrates flattening of a 2D kernel 620A, and flattening of 2D layer input values. In some embodiments, flattening of data includes appending data in a first dimension of a vector to data in a second dimension of a vector. For example, a two dimensional (2D) first vector is flattened, in some embodiments, by generating a one dimensional second vector that includes data in a first dimension of the first vector and then followed by data in a second dimension of the first vector. The example 2D kernel 620A is shown as a grid of three by three values.

FIG. 6 illustrates how input values 631A-C from the image 630A are read into a portion of a 3D memory unit, denoted 640A.

FIG. 6 also illustrates how the 2D input values are distributed across multiple rows of the 3D memory unit 640A. These portions of the 3D memory unit 640A are also represented as portions 641A-D in FIG. 6. Portion representations 641A-D illustrate an example distribution of portions of the 2D input values that are distributed across rows of the 3D memory unit 640A, with a first row distributed as portion 641A, second row as portion 641B, third row as portion 641C, and fourth row as portion 641D. FIG. 6 shows that some of the disclosed embodiments are provided with an ability to shift the 2D input values 631A-C across rows of the 3D memory unit 640A. For example, in a first shift operation, values stored in portion 641A are overwritten with values of portion 641B. Values stored in portion 641B are overwritten by values stored in portion 641C. Values stored in portion 641C are overwritten with values stored in portion 641D. By providing an ability to shift values across rows of a 3D memory unit, the flattening operation illustrated by FIG. 6 is facilitated and increased throughput achieved. For example, in some embodiments, the flattening operation reads data from a top row of the 3D memory unit, represented as portion 641A. After data included in the first row is read, values are shifted across rows of the 3D memory unit 640A. Thus, data previously occupying a second row, represented by portion 641B, is shifted into portion 641A. This shifted data is then read to perform a second flattening operation. This process may iterate for multiple rows of data.

Figure 7:
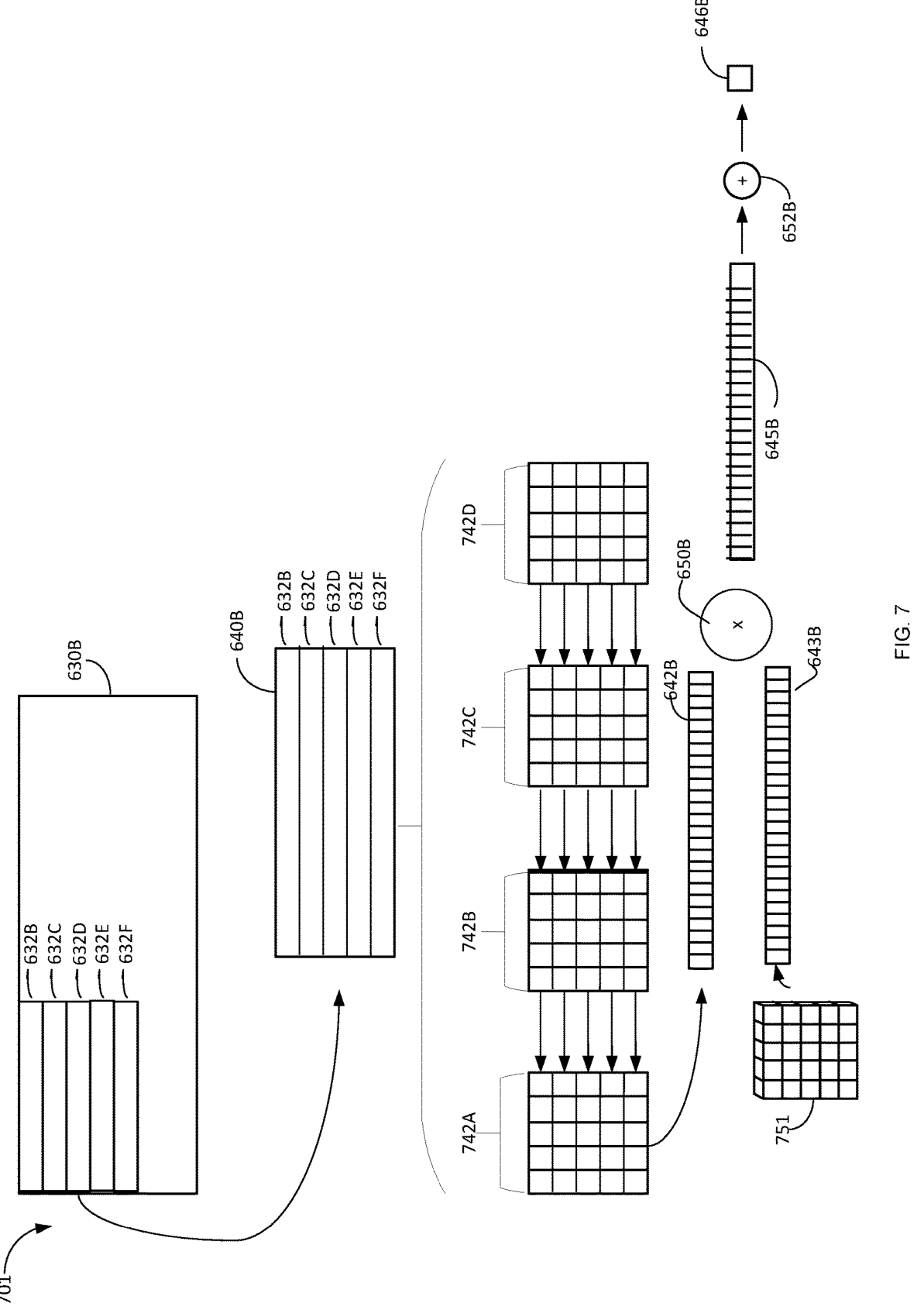
FIG. 7 illustrates a data flow that applies a three-dimensional (3D) kernel on 3D second layer input values obtained from an image.

FIG. 7 illustrates data flows when applying a 3D kernel 751 on a 3D second layer input values such as input values derived from image 630B. In FIG. 7 the example 3D kernel 751 is shown as a grid of five by five values. FIG. 7 illustrates flattening of the 3D kernel 751 into a kernel vector 643B. FIG. 7 also illustrates flattening of 3D input values 632B-632F into an input values vector 642B. FIG. 7 illustrates how the data stored in 3D memory 640B is included in multiple rows of a 3D memory. Each row of the 3D memory is represented by rows 742A-D. Thus, memory 640B and 742A-D represent different views of equivalent memory storage. FIG. 7 illustrates that data from a top row 742A is provided to vector 642B. After a flattening operation completes, data in the rows 742B-D are each shifted one row towards the top row 742A. Thus, data stored in row 742B is shifted to row 742A. Data stored in row 742C is shifted to row 742B. Data stored in row 742D is shifted to row 742C.

A number of values per kernel may differ from those illustrated above with respect to FIGS. 6 and/or 7. A size of the kernels may depend on the structure of the neural network. Larger kernels may perform more operations in parallel than smaller kernels, but may be inefficient when only a part of the elements on which the kernels are applied are relevant to an operation.

Line segments (such as line segments 631A-631C of FIG. 6 and line segments 632B-632F of FIG. 7) of image 630A and image 630B respectively are read to intermediate memories 640A and 640B respectively. In some embodiments, intermediate memories 640A and 640B are the same physical memory.

It should be noted that the intermediate memory 640A is large enough, in at least some embodiments, to store the entire 2D kernel. Alternatively, in other embodiments, the intermediate memory 640A may store only a portion of the values of the 2D kernel at any one time. There may be any relationship between a size of the intermediate memory 640A and a size of the 2D kernel.

In FIG. 6, three pixels from each one of the three line segments are read from the intermediate memory 640A into a first register to form layer input values vector 642A. In FIG. 7, five pixels from each of five line segments are read from the intermediate memory 640B into a first register to form layer input values vector 642B.

In FIG. 6, three first values from each one of the three rows of a 2D kernel are read into a second register to form a kernel vector 643A. In FIG. 7 five values from each one of the five rows of a 3D kernel 751 (one from each row) are read into a second register to form kernel vector 643B.

With respect to FIG. 6, multiplier 650A multiplies the layer input values vector 642A by the kernel vector 643A to provide a result vector 645A. Adder 652A sums the elements of result vector 645A to generate an output scalar 646A.

The data flow 600 may repeat until all line segments of image 630A are read, thereby scanning the entire image, and generating output scalars from all pixels of image 630A.

Similarly, in FIG. 7, multiplier 650B multiplies the layer input values vector 642B by the kernel vector 643B to provide an intermediate result vector 645B. Adder 652B sums the elements of intermediate result vector 645B to provide output scalar 646B.

The data flow 701 may repeat until all line segments of image 630B are read, thereby scanning the entire image, and generating output scalars from all pixels of image 630B.

Boundary values (in case of a 3×3 kernel—one upmost (e.g., top) row, the lowest (e.g., bottom) row, the leftmost column, the rightmost column) can be calculated in various manners. For example, padding the pixels outside the border by a predefined value, setting the boundary values to a predefined value, or other solutions.

Figure 8:
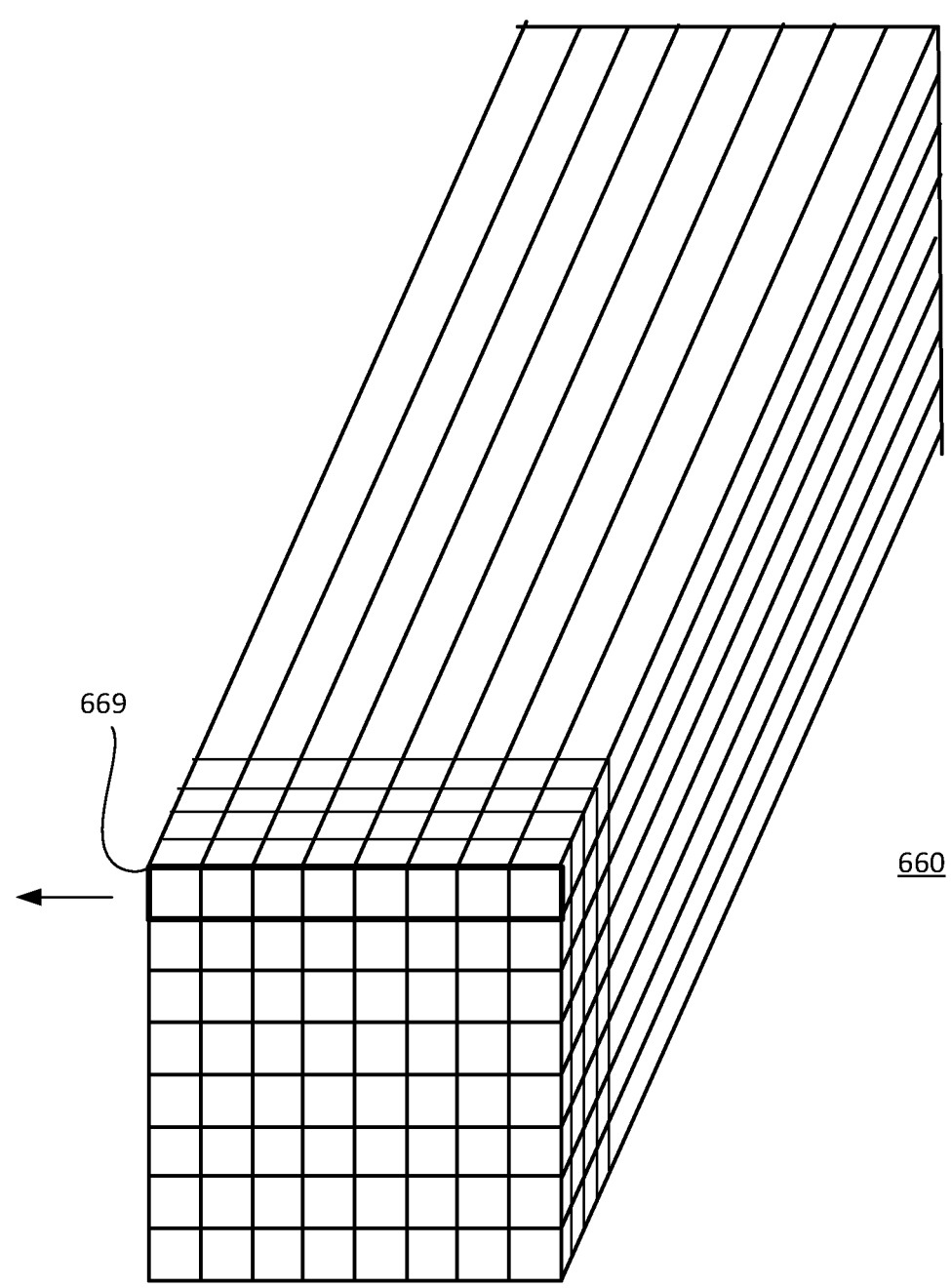
FIG. 8 illustrates an example structure of storage elements in a 3D memory unit.

FIG. 8 illustrates a 3D memory unit 660 that is configured to store multiple scalar values (for example 8×8×16 scalar values) in a 3D format or array. The 3D memory unit 660 is configured to store scalar values that are at least a portion of layer output values. In some embodiments, the scalar values are further processed (for example by applying a pool operation such as but not limited to maxpool, by applying an averaging function, by summing the values, and the like).

The 3D memory unit 660 is configured to store the scalar outputs regardless of the depth of the kernel, and regardless of the desired depth of the layer output values. In some embodiments, the depth of the kernel and the desired depth of the layer output values affect the manner in which the 3D memory unit 660 is read. For example, in case of a 2D kernel, the first scalar outputs are read, while other entries of the 3D memory unit 660 are not read.

Assuming a 3D kernel that has a depth that is not smaller than the desired depth of the layer output values, then the desired depth of the layer output values determines which elements are read.

The 3D memory unit 660 is configured to provide for the reading of data from any storage elements of the 3D memory unit 660. This, scalar values stored in the 3D memory unit 660 are read, in various embodiments, from various locations of the 3D memory unit 660. In some embodiments, scalar values are read from a first row 669 of the 3D memory unit 660.

In some embodiments, reading the scalar outputs from the first upper row 669 may require shifting and/or otherwise moving scalar outputs to the first upper row 669 before the values are read.

Figure 9:
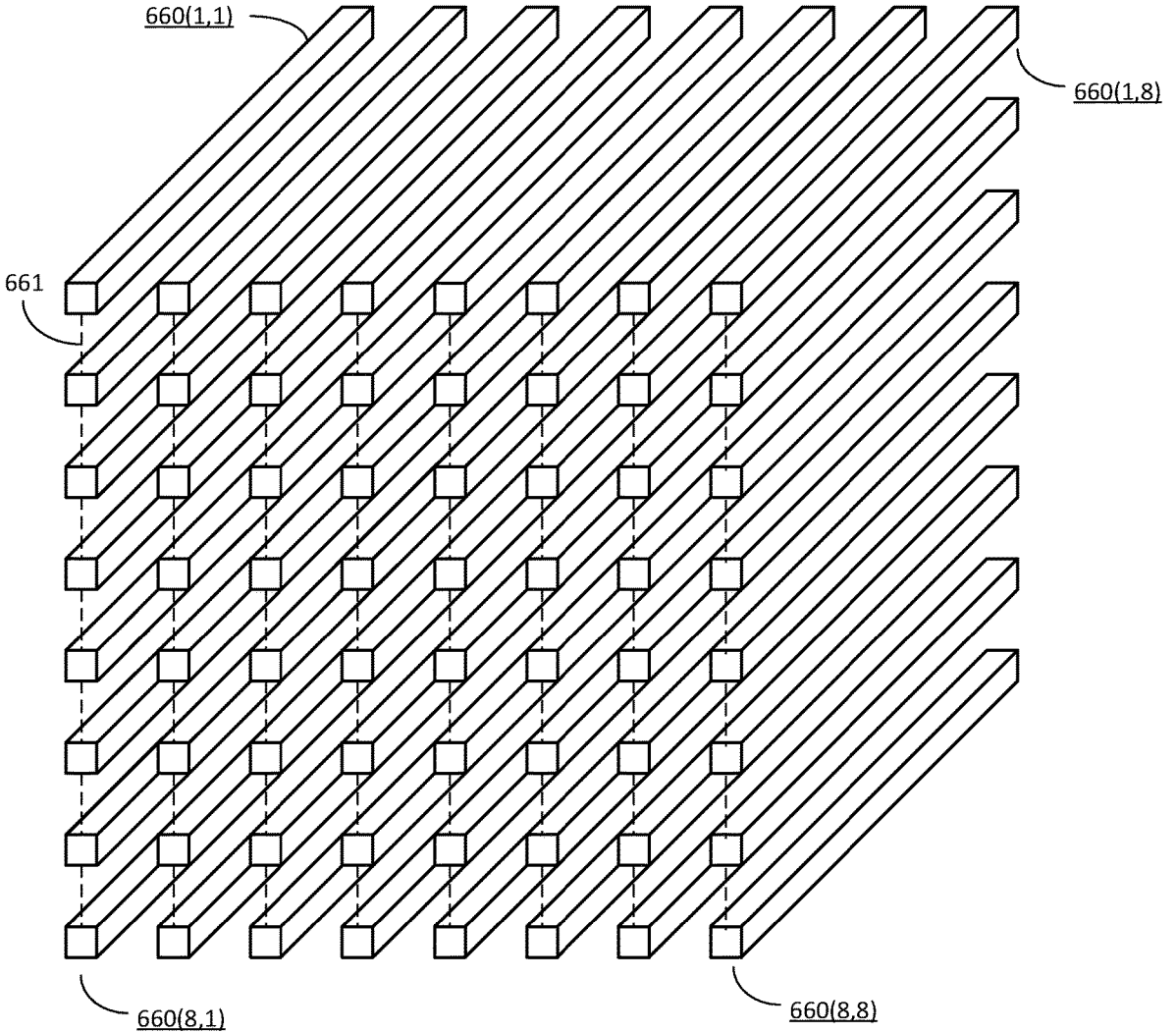
FIG. 9 illustrates an example of a 3D memory unit that is comprised of a two-dimensional array of shift registers.

FIG. 9 illustrates a 3D structure of at least a portion of a 3D memory unit. The 3D structure includes a plurality of storage elements organized in row, column, and depth dimensions. Thus, each value stored in the 3D structure is stored in a storage element having a unique combination of row, column, and depth coordinates. The example 3D structure shown in FIG. 9 includes an array of shift registers. The example 3D structure shown in FIG. 9 includes shift registers arranged in eight rows and eight columns. A portion of the shift registers are labeled. A first shift register positioned in a first row and a first column is labeled 660(1,1). A second shift register positioned in a last row, and first column is labeled 660(8,1). A third shift register positioned in the first row, last column is labeled 660(1,8), and a fourth shift register positioned in a last row and the last column is labeled 660(8,8). While FIG. 9 shows shift registered organized as eight rows and eight columns, other arrangements are contemplated. For example, some contemplated configurations have an unequal number of rows and columns, or different numbers of rows and/or columns.

Each shift register 660(1,1)-660(8,8) comprises a plurality of storage elements. Corresponding storage elements are storage elements in multiple shift registers that share the same column and depth coordinates, but are located in different rows. Adjacent and corresponding storage elements are coupled to each other via a data path 661 between the adjacent and corresponding storage elements. The data path 661 facilitates shifting of a value stored in a storage element to an adjacent corresponding storage element.

Thus, the 3D memory unit illustrated in FIG. 9 provides for shifting of values stored in storage elements of the 3D memory unit along at least two dimensions. Values are shiftable in a direction aligned with each of the shift registers. These shift operations move a value from a storage element having a first depth coordinate to a second storage element having a second depth coordinate. Values stored in the 3D structure are also shiftable, via the data paths, in a direction consistent with the column dimension. Thus, shifts in this direction move each value from a storage element having a first row coordinate to a different storage element having a second row coordinate. In some embodiments, a destination row coordinate of a shift operation is a lower order row than a source row coordinate of the shift operation.

The number of shift registers of the 3D memory may vary across embodiments. While FIG. 9 shows 64 shift registers, such a configuration is used, for example, when the 3D memory is configured to output 64 scalar outputs per cycle. Other embodiments employ fewer or a larger number of shift registers to accommodate a different number of scalar outputs per cycle. In various embodiments, arrays of shift registers are arranged in other manners and/or coupled to each other in other manners.

Figure 10:
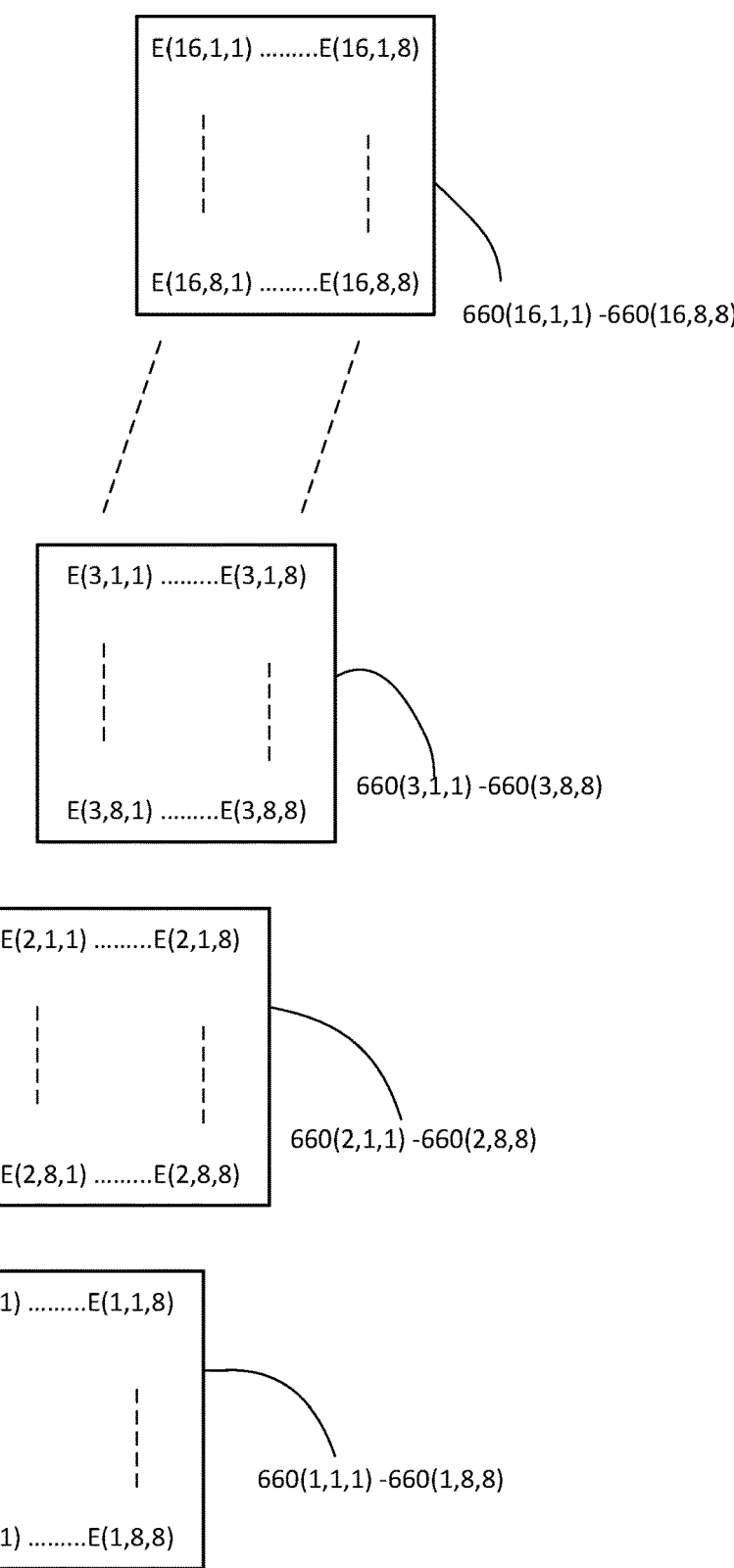
FIGS. 10, 11, and 12 illustrate multiple rows of storage elements in a 3D memory unit, and how read and shift operations operate in at least some of the disclosed embodiments.
Figure 11:
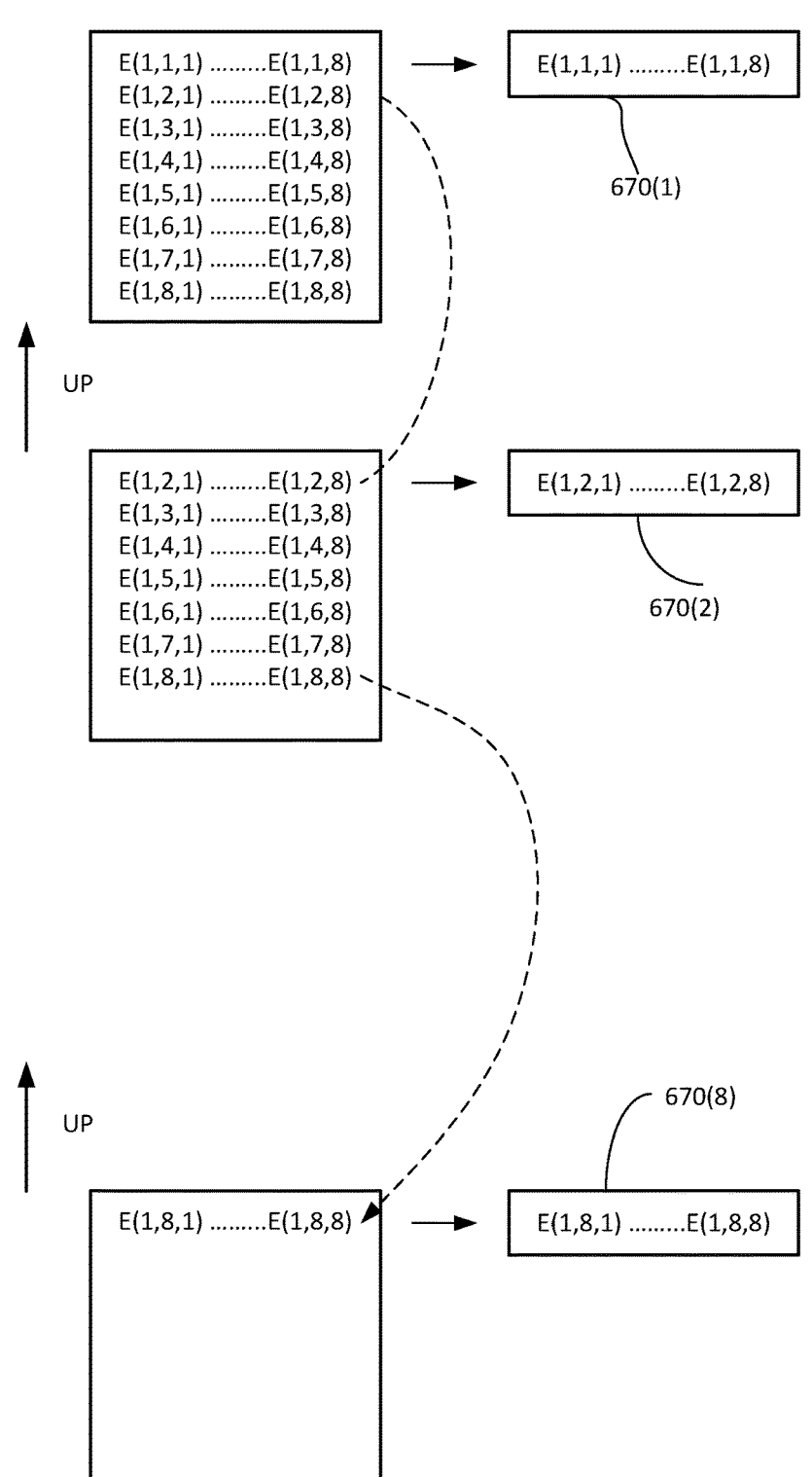
Figure 12:
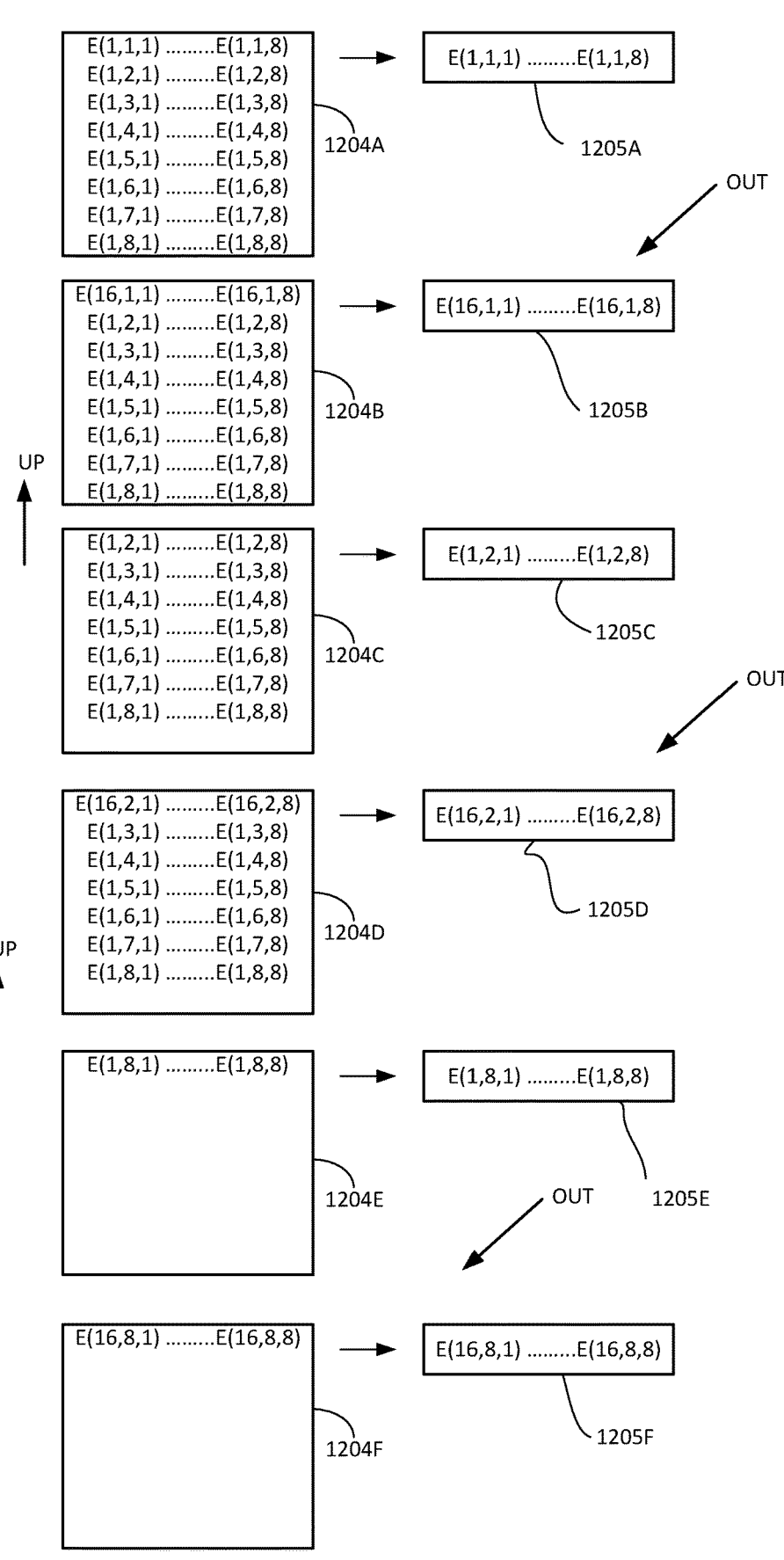

FIGS. 10, 11, and 12 illustrate multiple rows of storage elements in a 3D memory unit, and how read and shift operations operate in at least some of the disclosed embodiments. Each of FIGS. 10, 11, and 12 show an example array of sixty four registers, each with an example depth of sixteen. These example registers store 8×8×16 scalar outputs E(1,1,1)-E(16,8,8) 660(1,1,1)-660(16,8,8). FIG. 11 illustrates operations that output only the first scalar outputs. FIG. 12 shows operations that output an entire scalar output. One of skill in the art will understand that the example dimensions discussed above, such as a length of eight, a width of eight and a depth of sixteen are merely examples of numeric values, and that various embodiments are dimensioned differently than these examples.

In FIG. 11, eight first upper scalar outputs are output per cycle. Thus, to output all of the first sixty four scalar outputs, each output is followed by a shift up operation. The shift operations are facilitated, at least in some embodiments, via use of the data paths 661 between corresponding storage elements of shift registers, as illustrated in FIG. 9. For example, in some embodiments, the 3D memory unit is comprised of a two-dimensional array of shift registers. Data paths are provided between corresponding storage elements in the shift registers (e.g., those storage elements oriented in a common position within rows of the three-dimensional structure of the 3D memory unit). Shifting a scalar value from a first storage element to a second storage element via one of the data paths moves the scalar value to an adjacent row of the 3D storage structure. Thus, each shift up operation causes each row of shift registers to receive the scalar values previously stored in a lower row of shift registers.

During a first cycle, the outputted scalar values 1205A are scalar outputs E(1,1,1)-E(1,1,8) 660(1,1,1)-660(1,1,8), and a first UP shift operation occurs. In some embodiments, the UP-shift operation is facilitated by the data paths that couple storage elements within a common column of the 3D structure described above with respect to FIG. 9.

During a second cycle, the outputted scalar outputs are scalar outputs E(1,2,1)-E(1,2,8) 660(1,2,1)-660(1,2,8), and a second UP shift operation occurs.

The process repeats itself eight times, outputting scalar outputs E(1,8,1)-E(1,8,8) 660(1,8,1)-660(1,8,8).

FIG. 12 shows an example implementation where eight first upper scalar outputs are outputted per cycle. For example, FIG. 12 shows that with an example memory configuration 1204A, scalar values 1205A are output. With example memory configuration 1204B, scalar values 1205B are output. With example memory configuration 1204C, scalar values 1205C are output. With example memory configuration 1204D, scalar values 1205D are output. With example memory configuration 1204E, scalar values 1205E are output. With example memory configuration 1204F, scalar values 1205F are output. In order to output all sixty four scalar outputs of all sixteen depths, the content of the upper vectors are read (by performing shift operations of the shift registers located at the upper row of the array). Once the content of the upper vectors are read, a shift up operation in which each row of shift registers receives the scalar outputs previously stored in a lower row of shift registers, and the shifting of the content of the upper vectors are read.

Figure 13:
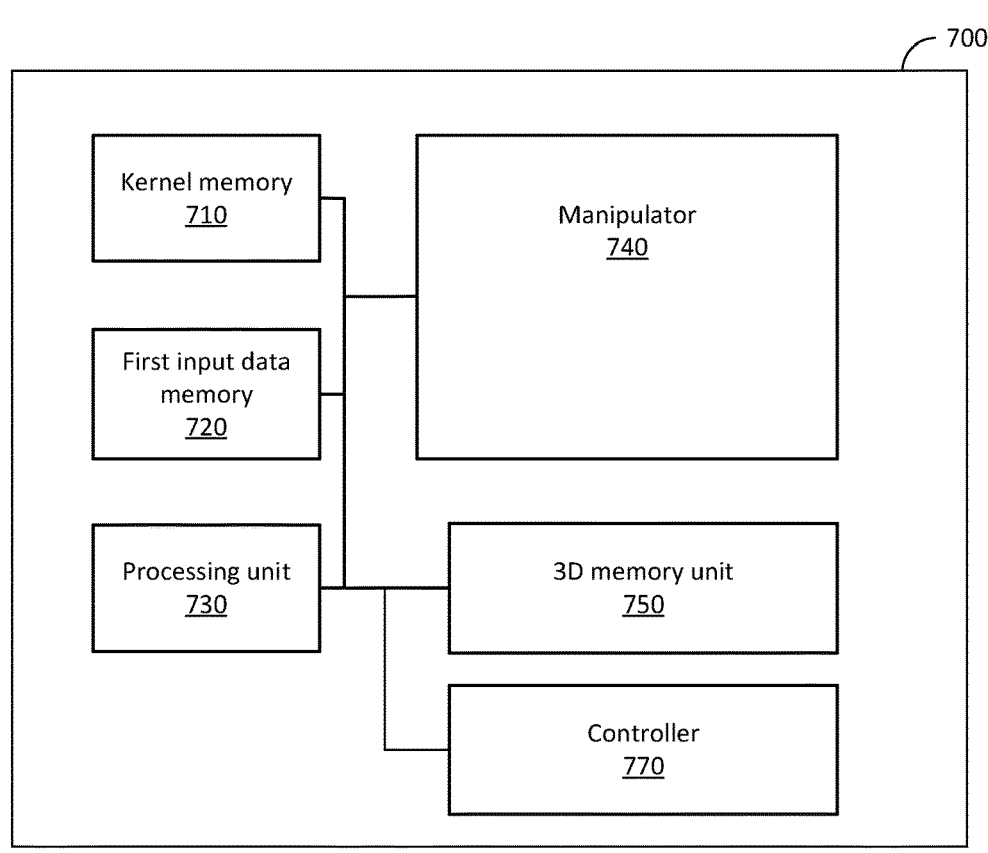
FIG. 13 is an example of a neural network processor.

FIG. 13 illustrates an example of a neural network processor 700. In at least some embodiments, the neural network processor 700 includes at least a part of at least one integrated circuit. The neural network processor 700 includes a substrate.

The neural network processor 700 includes kernel memory 710, a first input data memory 720, a 3D memory unit 750, a hardware processing unit 730, a manipulator 740, and a controller 770. The controller 770 is configured to control the neural network processor 700. Kernel memory 710 is configured to store a group of kernels utilized in neural network processing. The first input data memory 720 is configured to store first layer input data, such as the 2D first input values 401 illustrated above with respect to FIG. 4. In some embodiments, the 3D memory unit 750 includes the structure illustrated with respect to FIG. 9. In these embodiments, the 3D memory unit 750 includes data paths between at least some corresponding storage elements in adjacent rows of the 3D memory unit 750, as illustrated above with respect to FIG. 9 and data path 661.

The hardware processing unit 730 is configured to perform neural network processing operations, for example, convolution, maxpool (or any other reduction function), multiplying, adding, subtracting, and the like. The hardware processing unit 730 may include, adder 652A and multiplier 650A of FIG. 6 and addr 652B and multiplier 650B of FIG. 7 in at least some embodiments.

In some embodiments, the manipulator 740 is configured to flatten a 2D kernel, and flatten 2D layer input data. The manipulator 740 includes, in some embodiments, a read and write circuit for reading layer input values, writing row segments, reading 2D kernel and/or layer input data and writing the 2D kernel and/or layer input data as a vector.

In some embodiments, the first and second registers of FIGS. 6 and 7 are included in the manipulator 740 and/or the hardware processing unit 730 and/or in other embodiments are included outside both the manipulator 740 and the hardware processing unit 730.

FIG. 14 illustrates a process 1400 for neural network processing. In some embodiments, one or more of the functions discussed below with respect to process 1400 are performed by the hardware processing unit 730 and/or the manipulator 740, discussed above.

Method 1400 may include step 1410 of applying, by a neural network processor, a group of neural network kernels of respective layers of a neural network to provide neural network output results.

Step 1410 may be executed one layer after another, starting from a first layer of the neural network.

It is assumed that the group of neural network kernels (kernels) includes at least one 2D kernel and at least one 3D kernel. Usually there are more 3D kernels than 2D kernels.

Step 1410 may include step 1420 of applying a two dimensional (2D) kernel of the group of kernels on 2D layer input values of a first layer of the neural network to provide first layer output values, wherein the applying comprises scanning the 2D layer input values with the 2D kernel, wherein the scanning comprises flattening the 2D kernel, flattening the 2D layer input values, and storing first layer output values in a three dimensional (3D) memory unit.

Step 1410 may also include step 1430 of applying a 3D kernel of the group of kernels, on 3D layer input values of a second layer of the neural network to provide second layer output values, wherein the applying comprises scanning at least one feature vector of the 3D layer input values with at least one vector of the 3D kernel.

The 3D memory unit may include an array of shift registers. As discussed above with respect to FIG. 9, in some embodiments, corresponding storage elements of shift registers are coupled via a data path to provide for shifting of values between the corresponding storage elements.

Step 1420 may include step 1422 of outputting layer output values of a layer of the neural network from the array of shift registers. Step 1430 may include step 1432 of outputting layer output values of a layer of the neural network from the array of shift registers.

Steps 1422 and 1432 may include performing shift operations between source shift registers that are parallelly coupled to target shift registers.

Step 1432 may include performing shift operations within at least one target shift register.

Step 1432 may include performing a certain number of shift operations within at least one target shift register, wherein the certain number is set based on a depth of next layer input values.

Step 1422 and 1432 may include outputting values from only some of the shift registers of the array. This may simplify the output port of the array.

Step 1420 may include flattening of the 2D kernel by converting the 2D kernel to a kernel vector, wherein the flattening of the 2D layer input values comprises converting the 2D layer input values to a layer input values vector. The scanning may include multiplying the kernel vector by the layer input values vector to provide an intermediate result vector. The multiplying may be followed by summing elements of the intermediate result vector to provide an output scalar.

Step 1420 may include reading multiple line segments of the 2D layer input values to intermediate memory unit, and reading 2D segments of the 2D layer input values to a register to provide the 2D layer input values.

Step 1430 may include repeating, for each vector of the 3D kernel, scanning the 3D layer input values with a vector of the 3D kernel.

FIG. 15 illustrates a process 1500 for neural network processing. In some embodiments, one or more of the functions discussed below with respect to process 1500 are performed by the hardware processing unit 730 and/or the manipulator 740, discussed above.

In operation 1505, a 2D kernel is applied to 2D input values. For example, as discussed above with respect to FIG. 6, the 2D kernel 620A is flattened into a kernel vector 643A. Input values from an image, such as image 630A are read into an input values vector 642A. In the embodiment of FIG. 6, the two vectors, input values vector 642A and kernel vector 643A are multiplied to generate the result vector 645A. Values included in the result vector 645A are aggregated to generate the scalar value 646A.

In operation 1510, first layer output values are generated based on the applying performed in operation 1505. For example, as discussed above with respect to FIG. 6, the result vector 645A is generated by multiplying the flattened 2D kernel 620A and the 2D input values stored in the vector 642A. In some embodiments, elements of the result vector 645A are aggregated, at least in some embodiments, to generate a scalar value (e.g., 646A). In some embodiments, the first layer output values are output values for a first layer of a neural network.

In operation 1515, the first layer output values (e.g., the result vector 645A) are stored in a 3D memory unit. The 3D memory unit is organized, in at least some embodiments, as a three-dimensional array of storage elements. As illustrated above with respect to FIG. 9, in some embodiments, the three-dimensional array of storage elements is organized as a two-dimensional array of shift registers. Each of the shift registers includes a plurality of storage elements, and each of the shift registers is configured with data paths between adjacent storage elements. This provides for shifting of values stored in the storage elements to adjacent storage elements.

In operation 1520, a 3D kernel is applied to 3D layer input values. For example, as discussed above with respect to FIG. 7, in some embodiments, 3D input values (e.g., 632A-632F) are obtained from an image (e.g., 630b). A 3D kernel (e.g., 751) is flattened into a kernel vector (e.g., 643B). The 3D input values are also flattened into an input vector (e.g., 642B).

In operation 1525, second layer output values are generated based on the second applying. For example, as discussed above with respect to FIG. 7, two vectors (e.g., 642B and 643B) are then aggregated (e.g., multiplied via operator 650B) to generate 3D output values (e.g., 645B). In some embodiments, the 3D output values are aggregated to generate a scalar value (e.g., scaler value 646B). In some embodiments, the second layer output values are output values for a second layer of a neural network.

In operation 1530, the second layer output values are stored in the 3D memory.

In operation 1535, scalar values are read from the 3D memory. In some embodiments of operation 1535, the scalar values are read from a first row of a plurality of 2D rows of the 3D memory.

In operation 1540, scalar values stored in the 3D memory are shifted. For example, as described above, in some embodiments, the 3D memory is comprised of a two-dimensional array of shift registers. Adjacent and corresponding storage elements in different shift registers are linked, in some embodiments, via data paths. These data paths provide for shifting of values stored in the adjacent corresponding storage elements across rows of the 3D structure of the 3D memory. Thus, in some embodiments, operation 1540 is accomplished by shifting values from a source position in a source shift register to a corresponding destination position in a destination shift register. The source and destination shift registers are adjacent. In some embodiments, the destination shift register is in a lower order row of the 3D memory structure than the source shift register. The source position and destination position are corresponding, in that they share column and depth coordinates, and their position differs only in the row coordinate.

FIG. 16 illustrates a process 1600 for neural network processing. In some embodiments, one or more of the functions discussed below with respect to process 1600 are performed by the hardware processing unit 730 and/or the manipulator 740, discussed above. After start operation 1605, process 1600 moves to operation 1610, which reads 2D values from a first row of a 3D memory unit. For example, as explained above with respect to FIG. 6, in some embodiments, data is read from the first row represented as portion 641A into a vector 642A by flattening the data.

In operation 1615, the values are flattened. For example, as explained above with respect to FIG. 6, data from the first row, represented by portion 641A are flattened when read into the vector 642A.

In operation 1620, the flattened 2D values are applied to a 2D kernel. For example, as discussed above with respect to FIG. 6, the flattened data stored in vector 642A is applied to the 2D kernel 620A (flattened into the kernel vector 643A) to generate the result vector 645A. In operation 1625, data in a 3D memory unit is shifted along columns. For example, as discussed above with respect to FIG. 6, data included in a second row, represented by portion 641B of a 3D memory unit is shifted into portion 641A of the 3D memory unit. As discussed above with respect to FIG. 9, the disclosed 3D memory unit includes data paths 661 that provide for movement of data between corresponding storage elements in two adjacent rows of the 3D memory unit. Decision operation 1630 evaluates whether additional values stored in the 3D memory unit require processing. If more values exist, processing returns to operation 1610. Otherwise, process 1600 moves to end operation 1635.

The terms "unit", "component", and "module" are used in an interchangeable manner.

Any of the mentioned above memory or storage units may be implemented using any known technologies such as a volatile or nonvolatile memory including semiconductor-based memory units such as flash memory, EEPROM, EPROM, ROM; ferromagnetic digital memories; MRAM; volatile storage media including registers, buffers or caches, main memory, RAM, DRAM, SRAM, etc.

Any reference to any of the terms "comprise", "comprises", "comprising" "including", "may include" and "includes" may be applied to any of the terms "consists", "consisting", "and consisting essentially of". For example, any method describing steps may include more steps than those illustrated in the figure, only the steps illustrated in the figure or substantially only the steps illustrate in the figure. The same applies to components of a device, processor or system and to instructions stored in any non-transitory computer readable storage medium.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system values and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described as a single connection, a plurality of connections, unidirectional connections, or bidirectional connections.

Different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In some embodiments, the illustrated examples may be implemented as circuitry located on a single integrated circuit or within a same device. Alternatively, the examples may be implemented as any number of separate integrated circuits or separate devices interconnected with each other in a suitable manner.

The examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

The techniques of various embodiments may be implemented using software, hardware and/or a combination of software and hardware. Various embodiments are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various embodiments are also directed to methods, e.g., method of controlling and/or operating a communications device or devices, e.g., a network management node, an access point, wireless terminals (WT), user equipment (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as example approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the operations of the disclosed embodiments.

In some embodiments, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope. The methods and apparatus may be, and in various embodiments are, used with IP based and non-IP, wired and wireless such CDMA, orthogonal frequency division multiplexing (OFDM), Wi-Fi, Bluetooth, BLE, optical and/or various other types of communications techniques which may be used to provide communications links between network attached or associated devices or other devices including receiver/transmitter circuits and logic and/or routines, for implementing the methods.

We claim:

1. A neural network processor comprising:
a three-dimensional (3D) memory unit configured to store scalar values in a 3D array of storage elements, the 3D array of storage elements comprised of a plurality of two-dimensional (2D) rows and a 2D array of shift registers, the 3D memory unit including data paths between corresponding storage elements in adjacent rows of the 3D array; and
hardware processing circuitry configured to perform operations comprising:
applying a two-dimensional (2D) kernel on 2D layer input values of a first layer of a plurality of layers in a neural network;
generating, based on the applying of the 2D kernel, first layer output values;
storing the first layer output values in the 3D memory unit;
second applying a 3D kernel on 3D layer input values of a second layer of the plurality of layers in the neural network;
generating, based on the second applying of the 3D kernel, second layer output values;
storing the second layer output values in the 3D memory unit;
reading first scalar values from a first row of the plurality of layers of the 3D memory unit;
shifting, via the data paths, each of the scalar values stored in the 3D memory unit to a corresponding storage element in an adjacent row in response to a completion of the reading of the first scalar values from the first row; and
outputting layer output values of a layer of the neural network from the array of shift registers; and
wherein the shifting replaces all the first scalar values stored in the first row with second scalar values stored in an adjacent second row of the 3D memory unit, and replaces the second scalar values stored in the second row with third scalar values stored in a third row of the 3D memory unit, the third row adjacent to the second row, and wherein the shifting performs a certain number of shift operations across rows of the 3D memory unit, with the certain number of shift operations set based on a depth of next layer input values.

2. The neural network processor of claim 1, wherein each shift register of the 2D array of shift registers comprises a plurality of storage elements, the data paths linking corresponding storage elements in adjacent shift registers.

3. The neural network processor of claim 1, the operations further comprising scanning the 2D layer input values with the 2D kernel, wherein the scanning comprises flattening the 2D kernel, and flattening the 2D layer input values.

4. The neural network processor of claim 3, wherein the flattening of the 2D kernel comprises converting the 2D kernel to a kernel vector, wherein the flattening of the 2D layer input values comprises converting the 2D layer input values to a layer input values vector, and wherein the scanning comprises multiplying the kernel vector by the layer input values vector to provide an intermediate result vector.

5. The neural network processor of claim 4, the operations further comprising summing elements of the intermediate result vector to provide an output scalar.

6. The neural network processor of claim 3, wherein the flattening of the 2D layer input values comprises reading multiple line segments of the 2D layer input values to an intermediate memory unit, and reading 2D segments of the 2D layer input values to a register to provide the 2D layer input values.

7. The neural network processor of claim 1, the operations further comprising scanning at least one feature vector of the 3D layer input values with at least one vector of the 3D kernel.

8. The neural network processor of claim 1, wherein the second applying of the 3D kernel comprises repeating, for each vector of the 3D kernel, scanning the 3D layer input values with a vector of the 3D kernel.

9. A method for neural network processing, the method comprises:
applying, by a neural network processor, a group of neural network kernels of respective layers of a neural network to provide neural network output results;
wherein the applying of the group of kernels comprises:
applying a two dimensional (2D) kernel of the group of kernels on 2D layer input values of a first layer of the neural network to provide first layer output values, wherein the applying comprises scanning the 2D layer input values with the 2D kernel, wherein the scanning comprises flattening the 2D kernel, flattening the 2D layer input values, and storing first layer output values in a three dimensional (3D) memory unit, wherein the 3D memory unit comprises an array of shift registers, and wherein some of the shift registers are coupled to some other shift registers to shift data values across rows of the 3D memory unit; and
applying a 3D kernel of the group of kernels, on 3D layer input values of a second layer of the neural network to provide second layer output values, wherein the applying comprises scanning at least one feature vector of the 3D layer input values with at least one vector of the 3D kernel; and
outputting layer output values of a layer of the neural network from the array of shift registers, wherein the outputting includes performing a certain number of shift operations within at least one target shift register, and wherein the certain number is set based on a depth of next layer input values.

10. The method according to claim 9, wherein the outputting comprises performing shift operations between source shift registers of the array that are parallelly coupled to target shift registers of the array.

11. The method according to claim 9, wherein the outputting comprises performing shift operations within at least one target shift register.

12. The method according to claim 9, wherein the outputting comprises outputting the layer output values from only some of the shift registers of the array.

13. The method according to claim 9, wherein the flattening of the 2D kernel comprises converting the 2D kernel to a kernel vector, wherein the flattening of the 2D layer input values comprises converting the 2D layer input values to a layer input values vector, and wherein the scanning comprises multiplying the kernel vector by the layer input values vector to provide an intermediate result vector.

14. The method according to claim 13, comprising summing elements of the intermediate result vector to provide an output scalar.

15. The method according to claim 9, wherein the flattening of the 2D layer input values comprises reading multiple line segments of the 2D layer input values to intermediate memory unit, and reading 2D segments of the 2D layer input values to a register to provide the 2D layer input values.

16. The method according to claim 9, wherein the applying of the 3D kernel comprises repeating, for each vector of the 3D kernel, scanning the 3D layer input values with a vector of the 3D kernel.

17. An integrated circuit comprising a three-dimensional (3D) memory unit, a processing circuit, a manipulator, and one or more memory units that are configured to cooperate in:

applying a group of neural network kernels of respective layers of a neural network to provide neural network output results;

wherein the applying of the group of kernels comprises:

applying a two dimensional (2D) kernel of the group of kernels on 2D layer input values of a first layer of the neural network to provide first layer output values, wherein the applying comprising scanning the 2D layer input values with the 2D kernel, wherein the scanning comprises flattening the 2D kernel, flattening the 2D layer input values, and storing first layer output values in a three dimensional (3D) memory unit, and wherein the 3D memory unit comprises an array of shift registers, and wherein some of the shift registers are coupled to some other shift registers to shift data values across rows of the 3D memory unit; and applying a 3D kernel of the group of kernels, on 3D layer input values of a second layer of the neural network to provide second layer output values, wherein the applying comprises scanning at least one feature vector of the 3D layer input values with at least one vector of the 3D kernel; and outputting layer output values of a layer of the neural network from the array of shift registers, wherein the outputting includes performing a certain number of shift operations within at least one target shift register, and wherein the certain number is set based on a depth of next layer input values.

18. A non-transitory computer readable medium that stores instructions, which when executed by an integrated circuit, cause the integrated circuit to perform operations comprising:

applying, by a neural network processor, a group of neural network kernels of respective layers of a neural network to provide neural network output results, wherein the applying of the group of kernels comprises:

applying a two dimensional (2D) kernel of the group of kernels on 2D layer input values of a first layer of the neural network to provide first layer output values, wherein the applying comprising scanning the 2D layer input values with the 2D kernel, wherein the scanning comprises flattening the 2D kernel, flattening the 2D layer input values, and storing first layer output values in a three dimensional (3D) memory unit, wherein the 3D memory unit comprises an array of shift registers, and wherein some of the shift registers are coupled to some other shift registers to shift data values across rows of the 3D memory unit; and applying a 3D kernel of the group of kernels, on 3D layer input values of a second layer of the neural network to provide second layer output values, wherein the applying comprises scanning at least one feature vector of the 3D layer input values with at least one vector of the 3D kernel; and outputting layer output values of a layer of the neural network from the array of shift registers, wherein the outputting includes performing a certain number of shift operations within at least one target shift register, and wherein the certain number is set based on a depth of next layer input values.

19. The non-transitory computer readable medium according to claim 18, wherein the outputting comprises performing shift operations between source shift registers of the array that are parallelly coupled to target shift registers of the array.

20. The non-transitory computer readable medium according to claim 18, wherein the outputting comprises performing shift operations within at least one target shift register.

21. The non-transitory computer readable medium according to claim 18, wherein the outputting comprises outputting the layer output values from only some of the shift registers of the array.

22. The non-transitory computer readable medium according to claim 18, wherein the flattening of the 2D kernel comprises converting the 2D kernel to a kernel vector, wherein the flattening of the 2D layer input values comprises converting the 2D layer input values to a layer input values vector, and wherein the scanning comprises multiplying the kernel vector by the layer input values vector to provide an intermediate result vector.

23. The non-transitory computer readable medium according to claim 22, that stores instructions for summing elements of the intermediate result vector to provide an output scalar.

24. The non-transitory computer readable medium according to claim 18, wherein the flattening of the 2D layer input values comprises reading multiple line segments of the 2D layer input values to intermediate memory unit, and reading 2D segments of the 2D layer input values to a register to provide the 2D layer input values.

* * * * *